US012475838B2

(12) United States Patent
Yu et al.

(10) Patent No.: US 12,475,838 B2
(45) Date of Patent: Nov. 18, 2025

(54) DISPLAY DEVICE AND METHOD OF DRIVING THE SAME

(71) Applicants: Samsung Display Co., LTD., Yongin-si (KR); IUCF-HYU (Industry-University Cooperation Foundation Hanyang University), Seoul (KR)

(72) Inventors: Byungchang Yu, Yongin-si (KR); Kyunghoon Chung, Yongin-si (KR); Oh-Kyong Kwon, Seoul (KR); Youn-Sik Kim, Seoul (KR); Sung-Min Wee, Seoul (KR)

(73) Assignees: SAMSUNG DISPLAY CO., LTD., Gyeonggi-Do (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 18/632,430

(22) Filed: Apr. 11, 2024

(65) Prior Publication Data

US 2025/0006110 A1 Jan. 2, 2025

(30) Foreign Application Priority Data

Jun. 27, 2023 (KR) ........................ 10-2023-0082274

(51) Int. Cl.
*G09G 3/32* (2016.01)

(52) U.S. Cl.
CPC ....... *G09G 3/32* (2013.01); *G09G 2310/0267* (2013.01); *G09G 2310/08* (2013.01); *G09G 2320/0247* (2013.01)

(58) Field of Classification Search
CPC .......... G09G 3/32; G09G 3/3233; G09G 3/20; G09G 2310/0267; G09G 2310/08;
(Continued)

(56) References Cited

U.S. PATENT DOCUMENTS 9,460,662 B2 10/2016 Lee et al.
10,297,781 B2 * 5/2019 Yoon ...................... H10K 10/46
(Continued)

FOREIGN PATENT DOCUMENTS

KR 102185361 B1 12/2020
KR 1020210019639 A 2/2021
(Continued)

OTHER PUBLICATIONS

C. Lin et al., "Pixel Circuit With Leakage Prevention Scheme for Low-Frame-Rate AMOLED Displays," in IEEE Journal of the Electron Devices Society, vol. 8, pp. 235-240, 2020.
(Continued)

*Primary Examiner* — Christopher E Leiby
(74) *Attorney, Agent, or Firm* — CANTOR COLBURN LLP

(57) ABSTRACT

A display device includes a display panel including a pixel. The pixel includes a light emitting element, a first capacitor connected to a first node, a second capacitor connected between a second node and a voltage line, a first transistor connected to the first node, the second node, and a third node, a second transistor connected between the third node and the first node, a third transistor connected between the second node and a data line, a fourth transistor connected between the second node and the voltage line, a fifth transistor connected between the third node and the light emitting element, and a sixth transistor connected between the light emitting element and a reference voltage line.

27 Claims, 19 Drawing Sheets

(58) Field of Classification Search
CPC ... G09G 2310/0243; G09G 2310/0264; G09G 2320/0247; G09G 2320/0233; G09G 2320/0271; G09G 2320/0626; G09G 2300/0439; G09G 2300/0842
See application file for complete search history.

(56) References Cited

U.S. PATENT DOCUMENTS

| | | | | |
|---|---|---|---|---|
| 10,916,198 | B2 * | 2/2021 | Lin | G09G 3/3258 |
| 11,158,261 | B2 * | 10/2021 | Kim | G09G 3/3283 |
| 11,211,012 | B2 | 12/2021 | Hao et al. | |
| 11,249,270 | B2 * | 2/2022 | Vongseng | G02B 6/44526 |
| 11,361,713 | B1 * | 6/2022 | Fu | G09G 3/3241 |
| 2018/0033370 | A1 * | 2/2018 | Zheng | G09G 3/3233 |
| 2019/0130830 | A1 * | 5/2019 | Han | G09G 3/3233 |
| 2021/0193030 | A1 * | 6/2021 | Lee | G09G 3/3266 |
| 2021/0256908 | A1 * | 8/2021 | Park | G09G 3/3275 |
| 2022/0020330 | A1 * | 1/2022 | Cao | G09G 3/3258 |
| 2022/0173189 | A1 * | 6/2022 | Kim | G09G 3/325 |
| 2022/0180810 | A1 * | 6/2022 | Zhang | G09G 3/3241 |
| 2022/0366847 | A1 | 11/2022 | An et al. | |
| 2023/0042966 | A1 * | 2/2023 | Huangfu | G09G 3/3258 |
| 2023/0343294 | A1 * | 10/2023 | Guo | G09G 3/3266 |
| 2023/0386376 | A1 * | 11/2023 | Kim | G09G 3/3233 |
| 2024/0144859 | A1 * | 5/2024 | Zhang | G09G 3/32 |
| 2024/0144880 | A1 * | 5/2024 | Zhu | G09G 3/3233 |
| 2024/0177666 | A1 * | 5/2024 | Xiong | H10K 59/1213 |
| 2024/0203350 | A1 * | 6/2024 | Lee | G09G 3/3233 |
| 2024/0212615 | A1 * | 6/2024 | Lee | G09G 3/3233 |
| 2024/0321196 | A1 * | 9/2024 | Wang | G09G 3/20 |
| 2025/0006126 | A1 * | 1/2025 | Yuan | G09G 3/3233 |
| 2025/0078745 | A1 * | 3/2025 | Zhang | G09G 3/3233 |
| 2025/0087151 | A1 * | 3/2025 | Wang | H10K 59/1213 |

FOREIGN PATENT DOCUMENTS

| | | | |
|---|---|---|---|
| KR | 1020220076872 | A | 6/2022 |
| KR | 1020220154320 | A | 11/2022 |

OTHER PUBLICATIONS

N. Keum et al., "An AMOLED Pixel Circuit With a Compensating Scheme for Variations in Subthreshold Slope and Threshold Voltage of Driving TFTs," in IEEE Journal of Solid-State Circuits, vol. 55, pp. 3087-3096, 2020.

S.-M. Choi, et al., "A Self-compensated Voltage Programming Pixel Structure for Active-Matrix Organic Light Emitting Diodes" IDW Tech. Digest, 535-538 (2003).

* cited by examiner

DISPLAY DEVICE AND METHOD OF DRIVING THE SAME

This application claims priority to Korean Patent Application No. 10-2023-0082274, filed on Jun. 27, 2023, and all the benefits accruing therefrom under 35 U.S.C. § 119, the content of which in its entirety is herein incorporated by reference.

BACKGROUND

1. Field

Embodiments of the disclosure described herein relate to a display device and a driving method thereof, and more particularly, relate to a display device having uniform light emitting characteristics, and a driving method thereof.

2. Description of the Related Art

A light emitting display device among display devices displays an image by using a light emitting diode that generates light through the recombination of electrons and holes. The light emitting display device may be driven with a low power while providing a fast response speed.

The light emitting display device generally includes pixels connected with data lines and a scan line. Each of the pixels generally includes a light emitting diode, and a circuit unit for controlling the amount of current flowing to the light emitting diode. In response to a data signal, the circuit unit may control the amount of current that flows from a terminal, to which a first driving voltage is applied, to a terminal, to which a second driving voltage is applied, via the light emitting diode. In this case, light of predetermined luminance is generated to correspond to the amount of current flowing through the light emitting diode.

SUMMARY

Embodiments of the disclosure provide a display device having improved overall display quality by employing pixels having uniform light emitting characteristics even when an operating frequency is varied, and a driving method thereof.

According to an embodiment, a display device includes a display panel including a pixel. In such an embodiment, the pixel includes a light emitting element, a first capacitor connected to a first node, a second capacitor connected between a second node and a voltage line, a first transistor connected to the first node, the second node, and a third node, a second transistor connected between the third node and the first node and which receives a first scan signal, a third transistor connected between the second node and a data line and which receives a second scan signal, a fourth transistor connected between the second node and the voltage line and which receives a first emission control signal, a fifth transistor connected between the third node and the light emitting element and which receives a second emission control signal, and a sixth transistor connected between the light emitting element and a reference voltage line and which receives a third scan signal.

According to an embodiment, a display device includes a display panel including a pixel and a panel driver which drives the display panel.

In such an embodiment, the pixel includes a light emitting element, a first capacitor connected between a carrier trapping induction line, to which a carrier trapping induction signal is applied, and a first node, a first transistor connected between a second node and a third node and which operates depending on a potential of the first node, a second transistor connected between the third node and the first node and which operates depending on a first scan signal, and a third transistor connected between the second node and a data line and which operates depending on a second scan signal.

In such an embodiment, the display panel displays an image during a plurality of frames, and at least one frame among the plurality of frames includes a write frame and a holding frame. In such an embodiment, the carrier trapping induction signal has a first level during the write frame and has a second level different from the first level during a carrier trapping induction period preceding an emission period of the holding frame.

According to an embodiment, in a driving method of a display device, the display device includes a display panel including a pixel. In such an embodiment, the pixel includes a light emitting element, a first capacitor connected between a carrier trapping induction line and a first node, a first transistor connected between a second node and a third node, a second transistor connected between the third node and the first node, and a third transistor connected between the second node and a data line. In such an embodiment, the display panel displays an image during a plurality of frames, and at least one frame among the plurality of frames includes a write frame and a holding frame.

In such an embodiment, the driving method of the display device includes applying a carrier trapping induction signal having a first level to the carrier trapping induction line during the write frame, determining whether the holding frame starts, applying the carrier trapping induction signal having a second level lower than the first level to the carrier trapping induction line during a carrier trapping induction period preceding an emission period of the holding frame when it is determined that the holding frame starts, and applying the carrier trapping induction signal having the first level to the carrier trapping induction line during the emission period of the holding frame.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1:
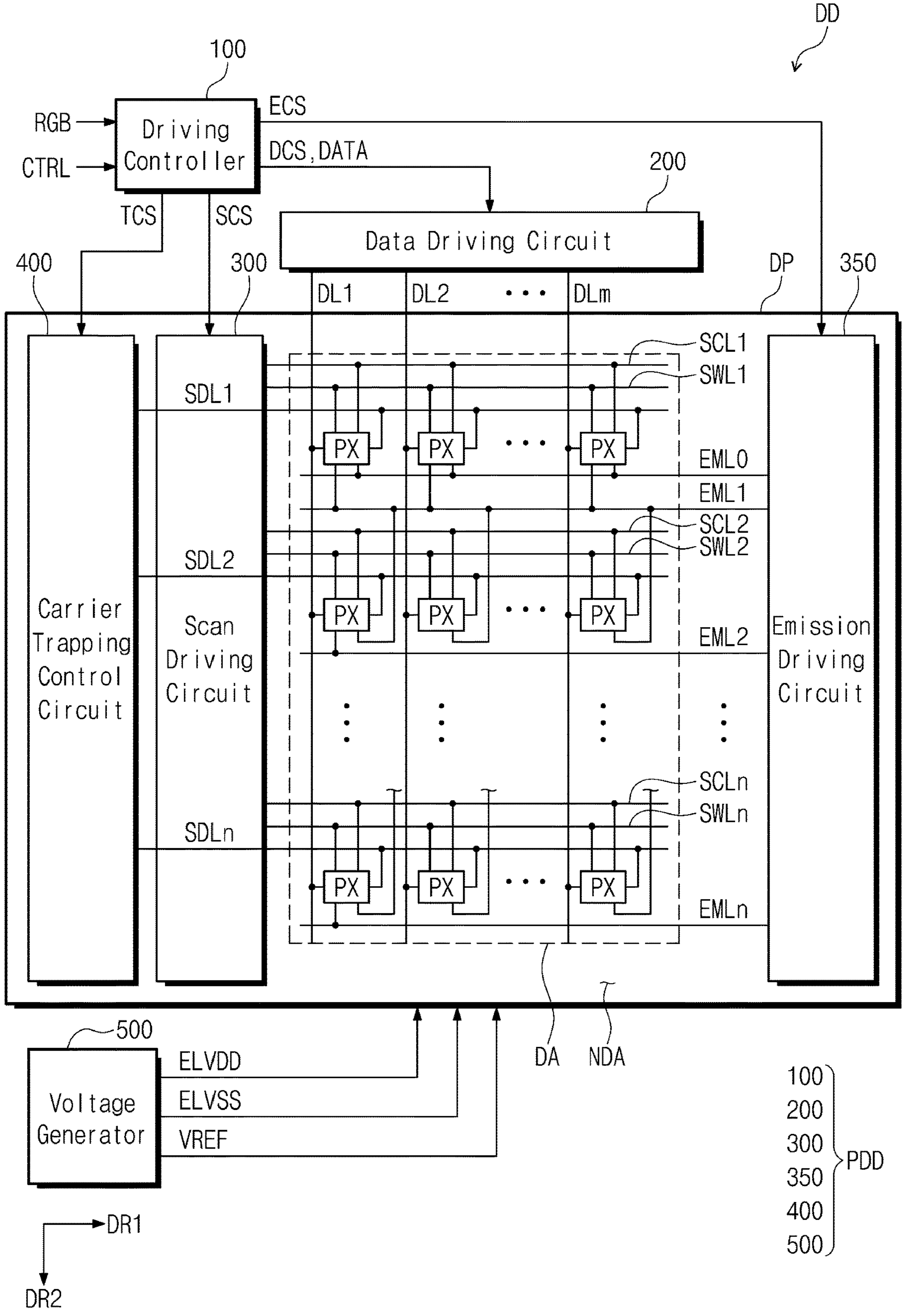
FIG. 1 is a block diagram of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms are relative and are described with reference to a direction indicated in the drawing.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to the accompanying drawings.

FIG. 1 is a block diagram of a display device, according to an embodiment of the disclosure.

Referring to FIG. 1, an embodiment of a display device DD may be a device that is activated depending on an electrical signal to display an image. The display device DD may be applied to an electronic device such as a smart watch, a tablet personal computer (PC), a notebook, a computer, or a smart television.

The display device DD includes a display panel DP and a panel driver PDD that drives the display panel DP. In an embodiment of the disclosure, a panel driver PDD may include a driving controller 100, a data driving circuit 200, a scan driving circuit 300, an emission driving circuit 350, a carrier trapping control circuit 400, and a voltage generator 500.

The driving controller 100 receives an image signal RGB and a control signal CTRL. The driving controller 100 generates image data DATA by converting a data format of the image signal RGB to be suitable for the interface specification of the data driving circuit 200. The driving controller 100 outputs a scan control signal SCS, a data control signal DCS, a light emitting driving signal ECS, and a carrier trapping control signal TCS based on the control signal CTRL.

The data driving circuit 200 receives the data control signal DCS and the image data DATA from the driving controller 100. The data driving circuit 200 converts the image data DATA into data signals and outputs the data signals to a plurality of data lines DL1 to DLm to be described later. The data signals are analog voltages corresponding to grayscale values of the image data DATA. The data signal may be referred to as "data voltages".

The voltage generator 500 generates voltages used to operate the display panel DP. In an embodiment of the disclosure, the voltage generator 500 generates a first driving voltage ELVDD, a second driving voltage ELVSS, and a reference voltage VREF. The reference voltage VREF may have a lower voltage level than the first driving voltage ELVDD.

The display panel DP includes a plurality of scan lines SCL1 to SCLn and SWL1 to SWLn, a plurality of emission control lines EML0 to EMLn, a plurality of data lines DL1 to DLm, and a plurality of pixels PX. A display area DA and a non-display area NDA are defined in the display panel DP. The scan lines SCL1 to SCLn and SWL1 to SWLn, the emission control lines EML0 to EMLn, the data lines DL1 to DLm, and the pixels PX may be disposed in the display area DA. The scan lines SCL1 to SCLn and SWL1 to SWLn extend in a first direction DR1 and are arranged spaced from each other in a second direction DR2. The emission control lines EML0 to EMLn extend in the first direction DR1 and are arranged spaced from each other in the second direction DR2. The data lines DL1 to DLm extend in the second direction DR2 and are arranged spaced from each other in the first direction DR1.

In an embodiment of the disclosure, the scan lines SCL1 to SCLn and SWL1 to SWLn may include the compensation scan lines SCL1 to SCLn and the write scan lines SWL1 to SWLn. However, the disclosure is not limited thereto, and the display panel DP may further include other scan lines.

In an embodiment of the disclosure, the display panel DP further includes a plurality of carrier trapping induction lines SDL1 to SDLn. The carrier trapping induction lines SDL1 to SDLn extend in the first direction DR1 and are arranged spaced in the second direction DR2. The carrier trapping induction lines SDL1 to SDLn may be positioned spaced from the compensation scan lines SCL1 to SCLn and the write scan lines SWL1 to SWLn.

The scan driving circuit 300 and the emission driving circuit 350 may be disposed in the non-display area NDA of the display panel DP. In an embodiment of the disclosure, the scan driving circuit 300 is positioned adjacent to one side of the display area DA, and the emission driving circuit 350 is positioned adjacent to the other side of the display area DA opposite to the one side. In an embodiment, as shown in FIG. 1, the scan driving circuit 300 and the emission driving circuit 350 may be respectively positioned on opposite sides of the display area DA, but the disclosure is not limited thereto. In an embodiment, for example, each of the scan driving circuit 300 and the emission driving circuit 350 may be positioned adjacent to one of one side and the other side of the display panel DP. In an embodiment, the scan driving circuit 300 and the emission driving circuit 350 may be integrated into one circuit. The carrier trapping control circuit 400 may be disposed in the non-display area NDA of the display panel DP to be adjacent to the scan driving circuit 300 or the emission driving circuit 350.

The plurality of pixels PX may be positioned in the display area DA of the display panel DP. The plurality of pixels PX are electrically connected to the compensation scan lines SCL1 to SCLn, the write scan lines SWL1 to SWLn, the emission control lines EML0 to EMLn, the data lines DL1 to DLm, and the carrier trapping induction lines SDL1 to SDLn. Each of the plurality of pixels PX may be electrically connected to two scan lines, two emission control lines, and one carrier trapping induction line. In an embodiment, for example, as shown in FIG. 1, the first row of pixels may be connected to the first compensation scan line SCL1, the first write scan line SWL1, the dummy emission control line EML0, the first emission control line EML1, and the first carrier trapping induction line SDL1. In such an embodiment, the second row of pixels may be connected to the second compensation scan line SCL2, the second write scan line SWL2, the first emission control line EML1, the second emission control line EML2, and the second carrier trapping induction line SDL2. However, the number of scan lines connected to each of the pixel and the number of emission control lines connected to each of the pixel are not limited thereto. In embodiments of the disclosure, for example, the number of scan lines and the number of emission control lines may be varied.

Each of the plurality of pixels PX includes a light emitting element ED (see FIG. 2) and a pixel circuit unit PXC (see FIG. 2) for controlling the emission of the light emitting element ED. The pixel circuit unit PXC may include one or more transistors and one or more capacitors. In an embodiment, the scan driving circuit 300, the emission driving circuit 350, and the carrier trapping control circuit 400 may be formed directly in the non-display area NDA of the display panel DP through a same process as transistors of the pixel circuit unit PXC.

Each of the plurality of pixels PX receives the first driving voltage ELVDD, the second driving voltage ELVSS, and the reference voltage VREF from the voltage generator 500.

The scan driving circuit 300 receives the scan control signal SCS from the driving controller 100. The scan driving circuit 300 may output compensation scan signals and write scan signals to the compensation scan lines SCL1 to SCLn and the write scan lines SWL1 to SWLn in response to the scan control signal SCS. The emission driving circuit 350 may output emission control signals to the emission control lines EML0 to EMLn in response to the light emitting driving signal ECS from the driving controller 100. The carrier trapping control circuit 400 may output carrier trapping induction signals to the carrier trapping induction lines SDL1 to SDLn in response to the carrier trapping control signal TCS from the driving controller 100.

According to an embodiment of the disclosure, the driving controller 100 may determine an operating frequency, and may control operations of the data driving circuit 200, the scan driving circuit 300, the emission driving circuit 350, and the carrier trapping control circuit 400 depending on the determined operating frequency. In an embodiment of the disclosure, the emission driving circuit 350 and the carrier trapping control circuit 400 may operate at a frequency higher than or equal to a frequency of the scan driving circuit 300.

Figure 2:
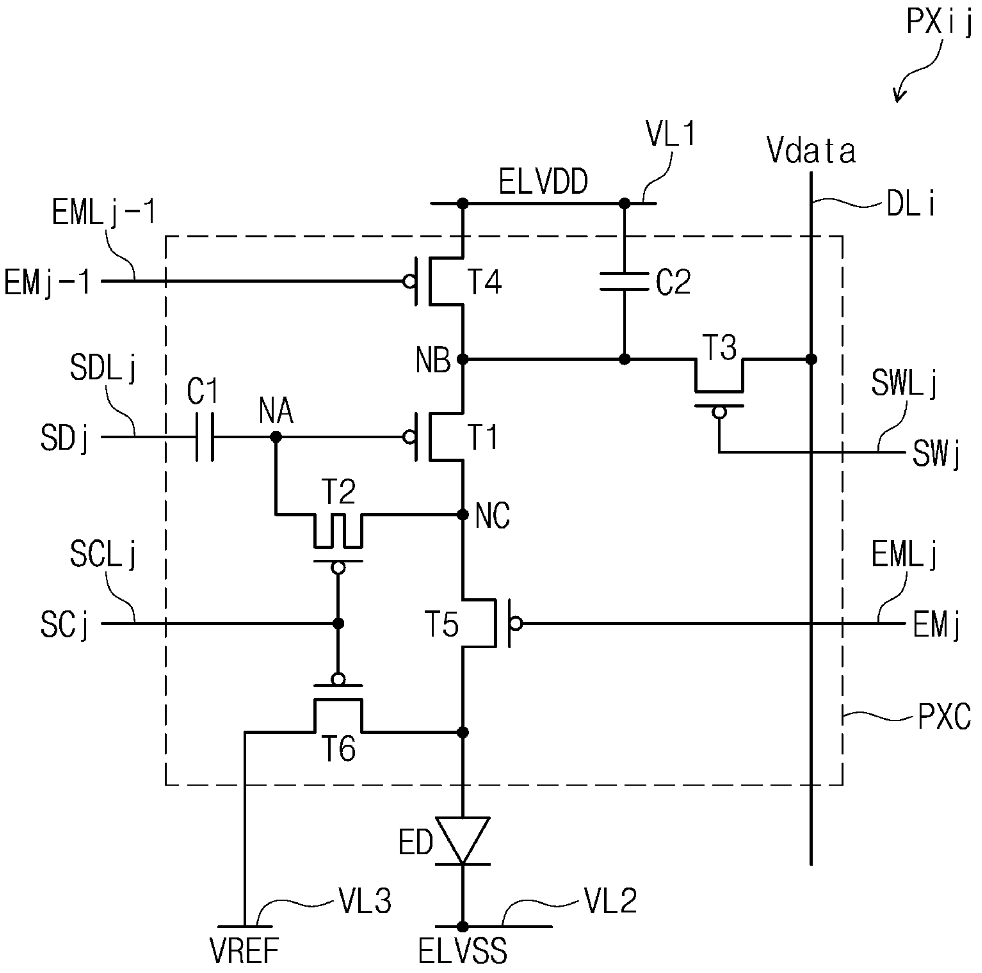
FIG. 2 is a circuit diagram of a pixel, according to an embodiment of the disclosure.

FIG. 2 is a circuit diagram of a pixel, according to an embodiment of the disclosure.

FIG. 2 shows an equivalent circuit diagram of a pixel PXij connected to an i-th data line DLi among the data lines DL1 to DLm, a j-th compensation scan line SCLj among the compensation scan lines SCL1 to SCLn, a j-th write scan line SWLj among the write scan lines SWL1 to SWLn, a (j−1)-th emission control line EMLj−1 and a j-th emission control line EMLj among the emission control lines EML0 to EMLn, and a j-th carrier trapping induction line SDLj among the carrier trapping induction lines SDL1 to SDLn, which are shown in FIG. 1. Because each of the plurality of pixels PX shown in FIG. 1 has a same circuit configuration as that of the pixel PXij shown in FIG. 2, any repetitive detailed descriptions of the remaining pixels will be omitted.

Referring to FIG. 2, the pixel PXij according to an embodiment includes the pixel circuit unit PXC and the light emitting element ED. In an embodiment of the disclosure, the pixel circuit unit PXC may include six transistors and two capacitors. Hereinafter, the six transistors will be respectively referred to as "first to sixth transistors T1, T2, T3, T4, T5, and T6". The two capacitors will be respectively referred to as "first and second capacitors C1 and C2".

In an embodiment, each of the first to sixth transistors T1 to T6 is a P-type transistor having a low-temperature polycrystalline silicon (LTPS) semiconductor layer. Alternatively, each of the first to sixth transistors T1 to T6 may be an N-type transistor. Moreover, at least one of the first to sixth transistors T1 to T6 may be an N-type transistor and the others thereof may be P-type transistors. Alternatively, at least one of the first to sixth transistors T1 to T6 may be a transistor having an oxide semiconductor layer. In an embodiment, for example, some of the first to sixth transistors T1 to T6 may be oxide semiconductor transistors, and others thereof may be LTPS transistors.

A circuit configuration of the pixel PXij according to an embodiment of the disclosure is not limited to the circuit configuration shown in FIG. 2. The pixel PXij illustrated in FIG. 2 is only an example, and the circuit configuration of the pixel PXij may be variously modified and implemented.

The j-th compensation scan line SCLj and the j-th write scan line SWLj supply a j-th compensation scan signal SCj and a j-th write scan signal SWj to the pixel PXij, respectively. The (j−1)-th emission control line EMLj−1 and the j-th emission control line EMLj supply a (j−1)-th emission control signal EMj−1 and a j-th emission control signal EMj to the pixel PXij, respectively. The j-th carrier trapping induction line SDLj supplies a j-th carrier trapping induction signal SDj to the pixel PXij. The i-th data line DLi delivers an i-th data voltage Vdata to the pixel PXij. The i-th data voltage Vdata may have a voltage level corresponding to the image signal RGB input to the display device DD (see FIG. 1).

The pixel PXij may be connected to a first voltage line VL1, a second voltage line VL2, and a reference voltage line VL3. The first voltage line VL1 delivers the first driving voltage ELVDD supplied from the voltage generator 500 shown in FIG. 1 to the pixel PXij. The second voltage line VL2 delivers the second driving voltage ELVSS supplied from the voltage generator 500 to the pixel PXij. The reference voltage line VL3 may deliver the reference voltage VREF supplied from the voltage generator 500 to the pixel PXij.

The first capacitor C1 is connected between the j-th carrier trapping induction line SDLj and a first node NA. The second capacitor C2 is connected between a second node NB and the first voltage line VL1.

The first transistor T1 is connected to the first node NA, the second node NB, and a third node NC, and may operate depending on a potential difference between the first node NA and the second node NB. The first transistor T1 includes a first electrode connected to the second node NB, a second electrode connected to the third node NC, and a gate electrode connected to the first node NA. The first transistor T1 electrically connect the second node NB and the third node NC to each other in response to the potential of the first node NA.

The second transistor T2 is connected between the first node NA and the third node NC and receives a first scan signal. The second transistor T2 includes a first electrode connected to the third node NC, a second electrode connected to the first node NA, and a gate electrode that receives the first scan signal. In an embodiment of the disclosure, the second transistor T2 may be connected to the j-th compensation scan line SCLj to receive the j-th compensation scan signal SCj as the first scan signal. The second transistor T2 is turned on in response to the first scan signal, and delivers a signal, which is output from the second electrode of the first transistor T1, to the first node NA. In an embodiment of the disclosure, the second transistor T2 may include a plurality of sub-transistors connected in series between the first and third nodes NA and NC. Gate electrodes of the plurality of sub-transistors may be commonly connected to the j-th compensation scan line SCLj.

The third transistor T3 is connected between the second node NB and the i-th data line DLi and receives a second scan signal. The third transistor T3 includes a first electrode connected to the i-th data line DLi, a second electrode connected to the second node NB, and a gate electrode that receives the second scan signal. In an embodiment of the disclosure, the third transistor T3 may be connected to the j-th write scan line SWLj and may receive the j-th write scan signal SWj as the second scan signal. The third transistor T3 is turned on in response to the second scan signal and outputs the i-th data voltage Vdata, which is supplied through the i-th data line DLi, to the second node NB.

The fourth transistor T4 is connected between the first voltage line VL1 that receives the first driving voltage ELVDD and the second node NB, and receives a first emission control signal. The fourth transistor T4 includes a first electrode connected to the first voltage line VL1, a second electrode connected to the second node NB, and a gate electrode that receives the first emission control signal. The fourth transistor T4 may be connected to the (j−1)-th emission control line EMLj−1 to receive the (j−1)-th emission control signal EMj−1 as the first emission control signal. The fourth transistor T4 electrically connects the second node NB and the first voltage line VL1 to each other in response to the first emission control signal.

The fifth transistor T5 is connected between the third node NC and the light emitting element ED, and receives a second emission control signal. The fifth transistor T5 includes a first electrode connected to the third node NC, a second electrode connected to the light emitting element ED, and a gate electrode that receives the second emission control signal. In an embodiment of the disclosure, the fifth transistor T5 may be connected to the j-th emission control line EMLj and may receive the j-th emission control signal EMj as the second emission control signal. The fifth transistor T5 electrically connects the third node NC and the light emitting element ED to each other in response to the second emission control signal.

The sixth transistor T6 is connected between the reference voltage line VL3 and the light emitting element ED, and receives a third scan signal. The sixth transistor T6 includes a first electrode connected to the light emitting element ED, a second electrode connected to the reference voltage line VL3, and a gate electrode that receives the third scan signal. In an embodiment of the disclosure, the sixth transistor T6 may be connected to the j-th compensation scan line SCLj and may receive the j-th compensation scan signal SCj as the third scan signal. The sixth transistor T6 electrically connects the anode of the light emitting element ED and the reference voltage line VL3 to each other in response to the third scan signal. In an embodiment of the disclosure, the first and third scan signals may be a same signal as each other. In such an embodiment, the first and third scan signals may be signals activated prior to the second scan signal.

The light emitting element ED is connected between the second voltage line VL2 that receives the second driving voltage ELVSS and the fifth transistor T5. An anode of the light emitting element ED is connected to the second electrode of the fifth transistor T5. A cathode of the light emitting element ED is connected to the second voltage line VL2.

Figure 3A:
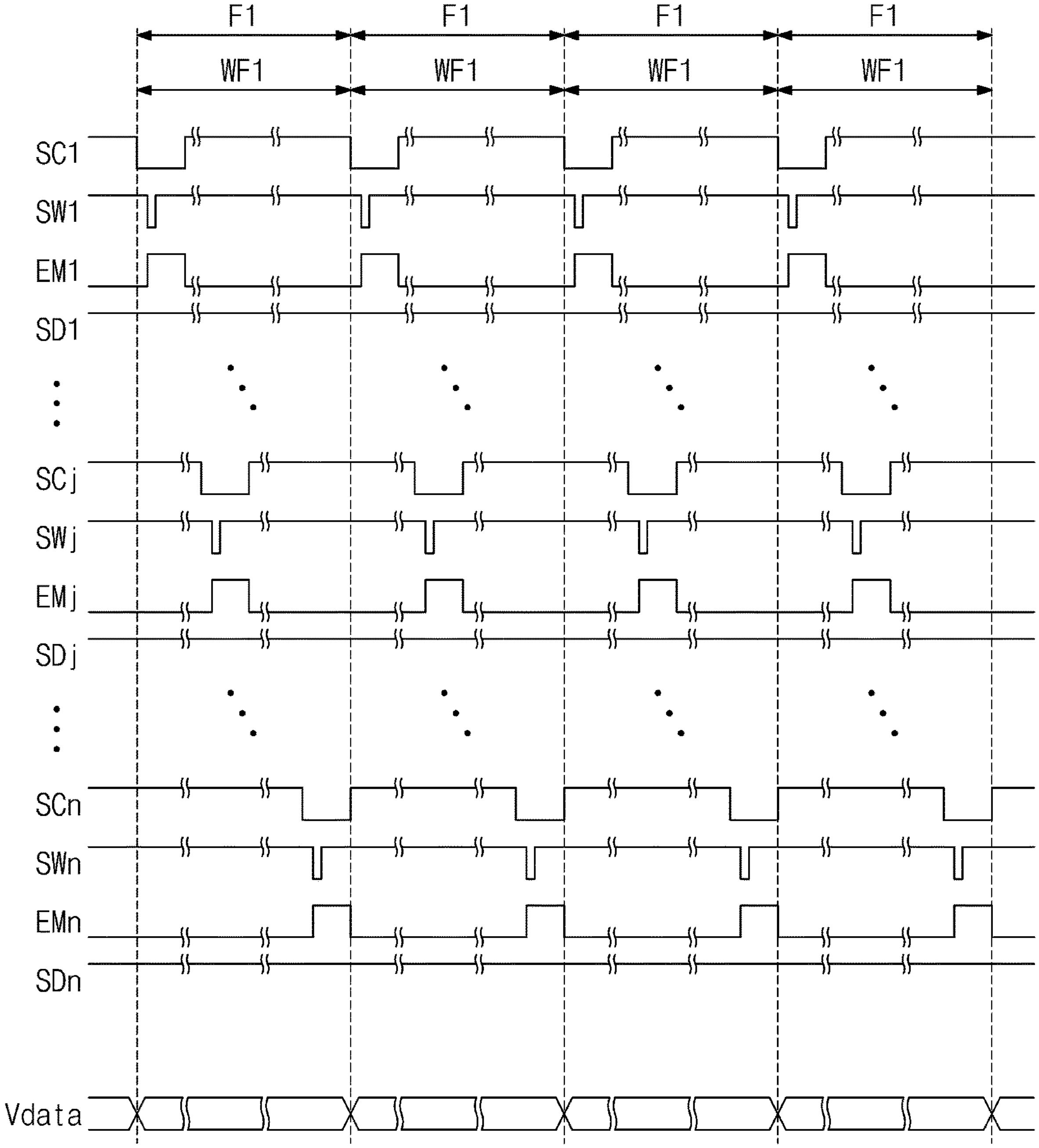
FIGS. 3A and 3B are signal timing diagrams for describing an operation of a display device, according to an embodiment of the disclosure.
Figure 3B:
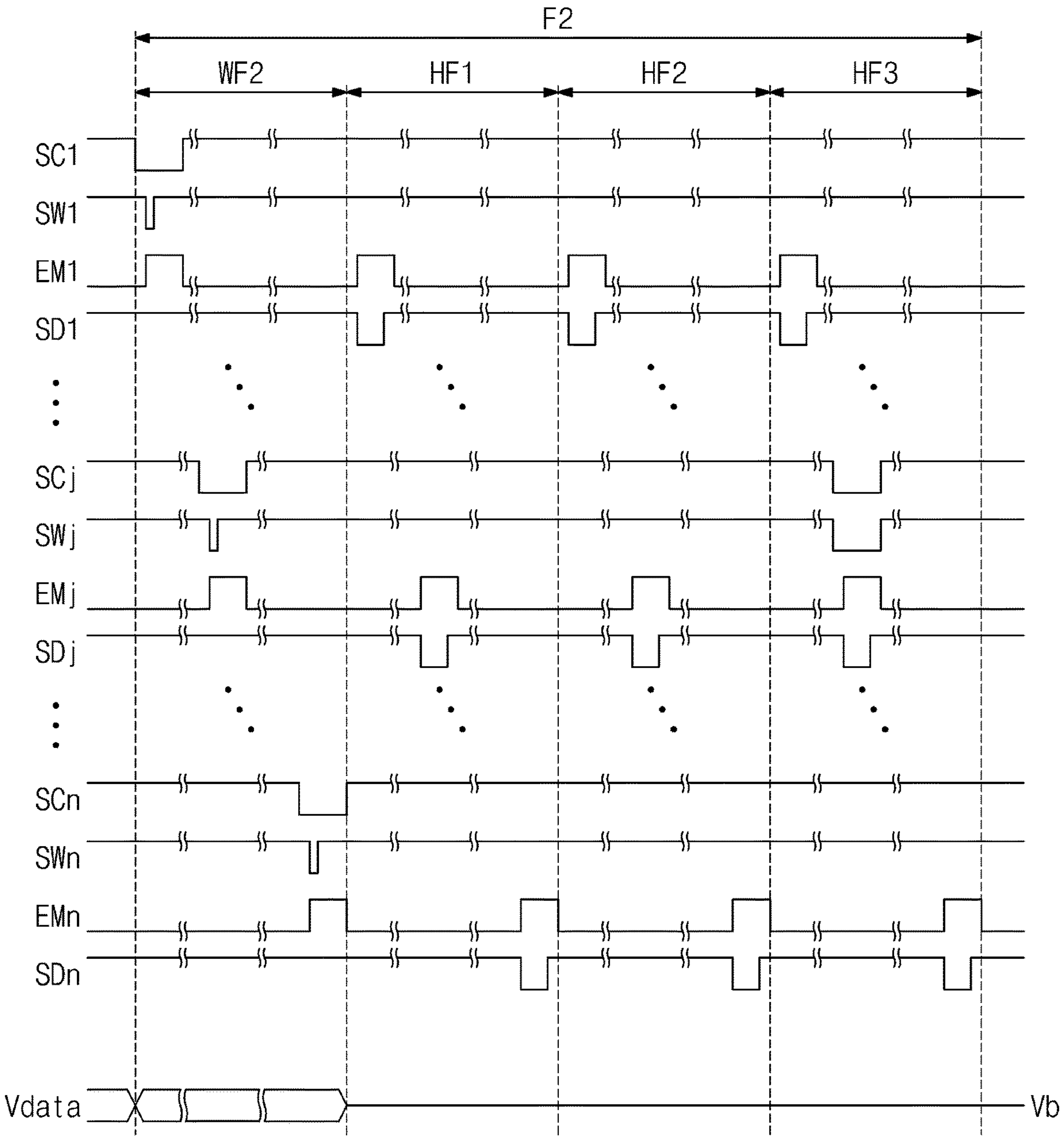

FIG. 3A is a signal timing diagram for describing an operation of a display device at a first operating frequency, according to an embodiment of the disclosure. FIG. 3B is a signal timing diagram for describing an operation of a display device at a second operating frequency, according to an embodiment of the disclosure.

Referring to FIGS. 1 to 3B, an operating frequency of the display device DD may be varied. In an embodiment of the disclosure, the first operating frequency may be the highest operating frequency at which the display device DD is capable of operating. In an embodiment, for example, the first operating frequency may be 360 hertz (Hz). The first operating frequency may be referred to as a “reference frequency” or “maximum frequency”.

When the display device DD operates at the first operating frequency, the scan driving circuit 300 may sequentially activate the compensation scan signals SC1, SCj, and SCn and the write scan signals SW1, SWj, and SWn to be at low levels during each of a plurality of first frames F1 as shown in FIG. 3A. During each of the plurality of first frames F1, the emission driving circuit 350 may sequentially deactivate the first emission control signals EM1, EMj, and EMn to be at high levels. FIG. 3A shows an embodiment where activation levels of the compensation scan signals SC1, SCj, and SCn, the write scan signals SW1, SWj, and SWn, and the first emission control signals EM1, EMj, and EMn are the low levels, and deactivation levels thereof are the high levels, but the disclosure is not limited thereto. In an embodiment, for example, where the first to sixth transistors T1 to T6 shown in FIG. 2 are N-type transistors, the activation levels of the compensation scan signals SC1, SCj, and SCn, the write scan signals SW1, SWj, and SWn and the first emission control signals EM1, EMj, and EMn may be the high levels, and the deactivation levels thereof may be the low levels.

When the first operating frequency is the maximum frequency, each first frame F1 may include only a first write frame WF1. In this case, a duration of the first write frame WF1 may be substantially equal to a duration of each first frame F1. When the display device DD operates at the first operating frequency, the carrier trapping induction signals SD1, SDj, and SDn may be maintained at first levels during the first write frame WF1. In an embodiment of the disclosure, the first levels of the carrier trapping induction signals SD1, SDj, and SDn may be the same as the deactivation levels (i.e., high levels) of the compensation scan signals SC1, SCj, and SCn.

Referring to FIGS. 1 to 3B, the display device DD may operate at a second operating frequency lower than the first operating frequency. In an embodiment of the disclosure, the second operating frequency is 90 Hz, but the second operating frequency is not limited thereto. The operating frequency of the display device DD may be changed in various manners. In an embodiment, the operating frequency of the display device DD may be determined depending on characteristics of the image signal RGB (e.g., a video or a still image).

When the display device DD operates at the second operating frequency lower than the first operating frequency, a duration of each second frame F2 may be greater than the duration of each first frame F1 shown in FIG. 3A. In an embodiment of the disclosure, the duration of each second frame F2 may be substantially four times the duration of each first frame F1. Each of the second frames F2 may include a second write frame WF2 and holding frames HF1, HF2, and HF3. The second write frame WF2 may have the same duration as that of the first write frame WF1 shown in FIG. 3A.

During the second write frame WF2, the scan driving circuit 300 may sequentially activate the compensation scan signals SC1, SCj, and SCn and the write scan signals SW1, SWj, and SWn to be at activation levels (e.g., low levels). During the second write frame WF2, the emission driving circuit 350 may sequentially deactivate the first emission control signals EM1, EMj, and EMn to be at deactivation levels (e.g., high levels).

During the holding frames HF1, HF2, and HF3, the scan driving circuit 300 maintains the compensation scan signals SC1, SCj, and SCn and the write scan signals SW1, SWj, and SWn at the deactivation levels (e.g., the high levels). During the holding frames HF1, HF2, and HF3, the emission driving circuit 350 may sequentially deactivate the first emission control signals EM1, EMj, and EMn to be at the deactivation levels (e.g., the high levels). That is, even when the operating frequency of the display device DD changes to the second operating frequency, the first emission control signals EM1, EMj, and EMn may still be output at the maximum frequency (i.e., the first operating frequency). FIG. 3B shows an embodiment in which the three holding frames HF1, HF2, and HF3 are included in the second frame F2, but the disclosure is not limited thereto. In embodiments, for example, the number of holding frames included in the second frame F2 may vary depending on the magnitude of the second operating frequency.

In an embodiment, during the holding frames HF1, HF2, and HF3, the i-th data voltage Vdata may be held as a bias voltage Vb. The bias voltage Vb may be a voltage maintained at a constant voltage level during the holding frames HF1, HF2, and HF3. In an embodiment of the disclosure, the bias voltage Vb may have a voltage level corresponding to a black grayscale, but is not limited thereto.

When the display device DD operates at the second operating frequency, the carrier trapping control circuit 400 may maintain the carrier trapping induction signals SD1, SDj, and SDn to be at first levels (e.g., high levels) during the second write frame WF2. In such an embodiment, during the holding frames HF1, HF2, and HF3, the carrier trapping induction signals SD1, SDj, and SDn may not be maintained at the first levels, but may be sequentially changed to second levels (e.g., low levels) different from the first levels. In an embodiment of the disclosure, the second level may be the same as the activation level (i.e., a low level) of each of the compensation scan signals SC1, SCj, and SCn. That is, the second level may be lower than the first level. However, the disclosure is not limited thereto. In an embodiment, for example, where the first to sixth transistors T1 to T6 shown in FIG. 2 are N-type transistors, the second level may be higher than the first level.

Figure 4A:
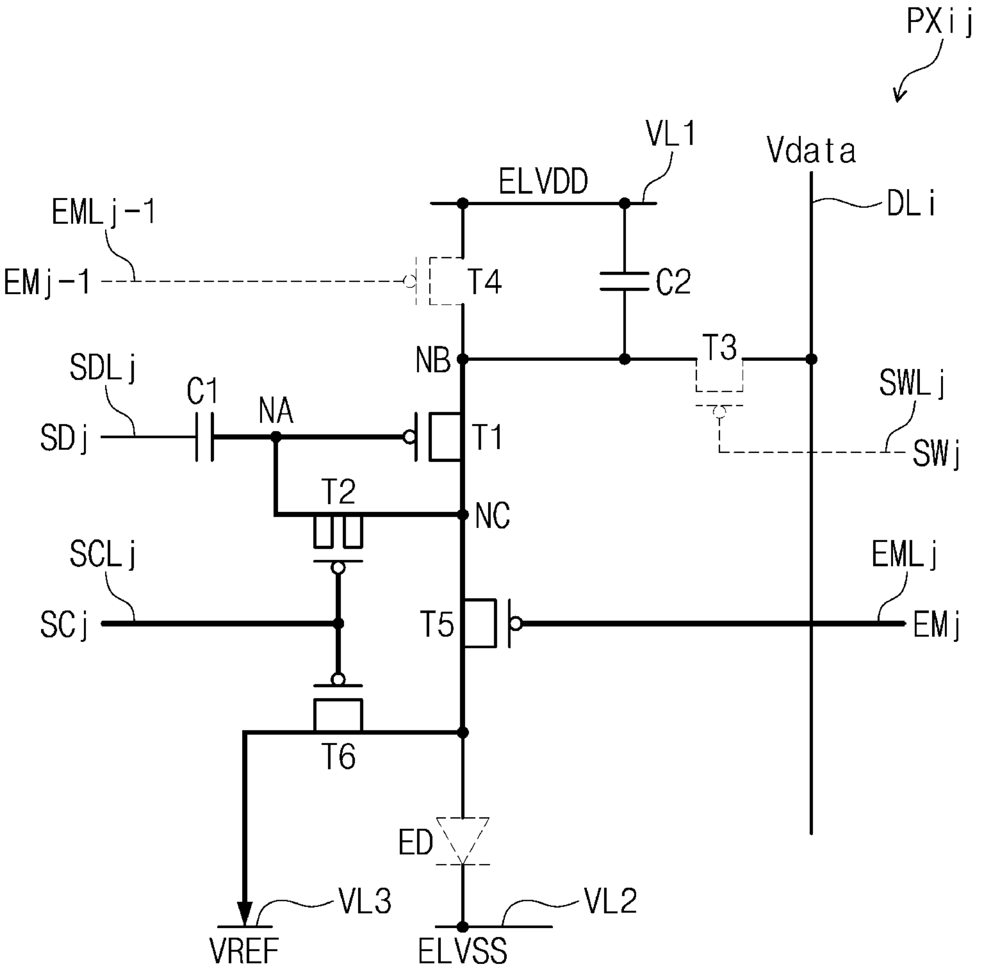
FIGS. 4A and 4B are diagrams for describing an operation of a pixel during a first period, according to an embodiment of the disclosure.
Figure 4B:
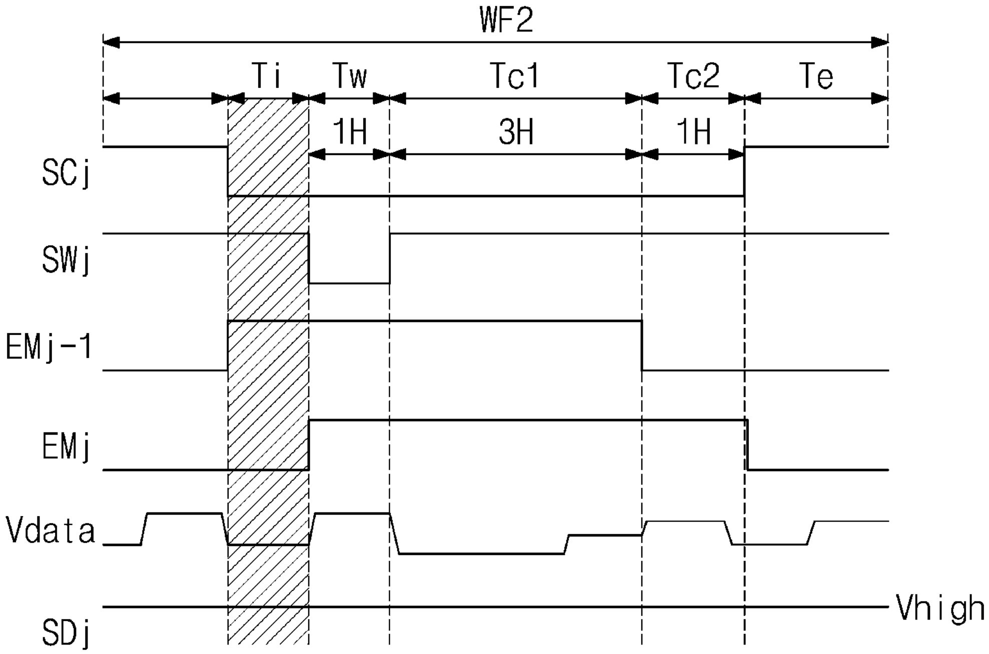
Figure 5A:
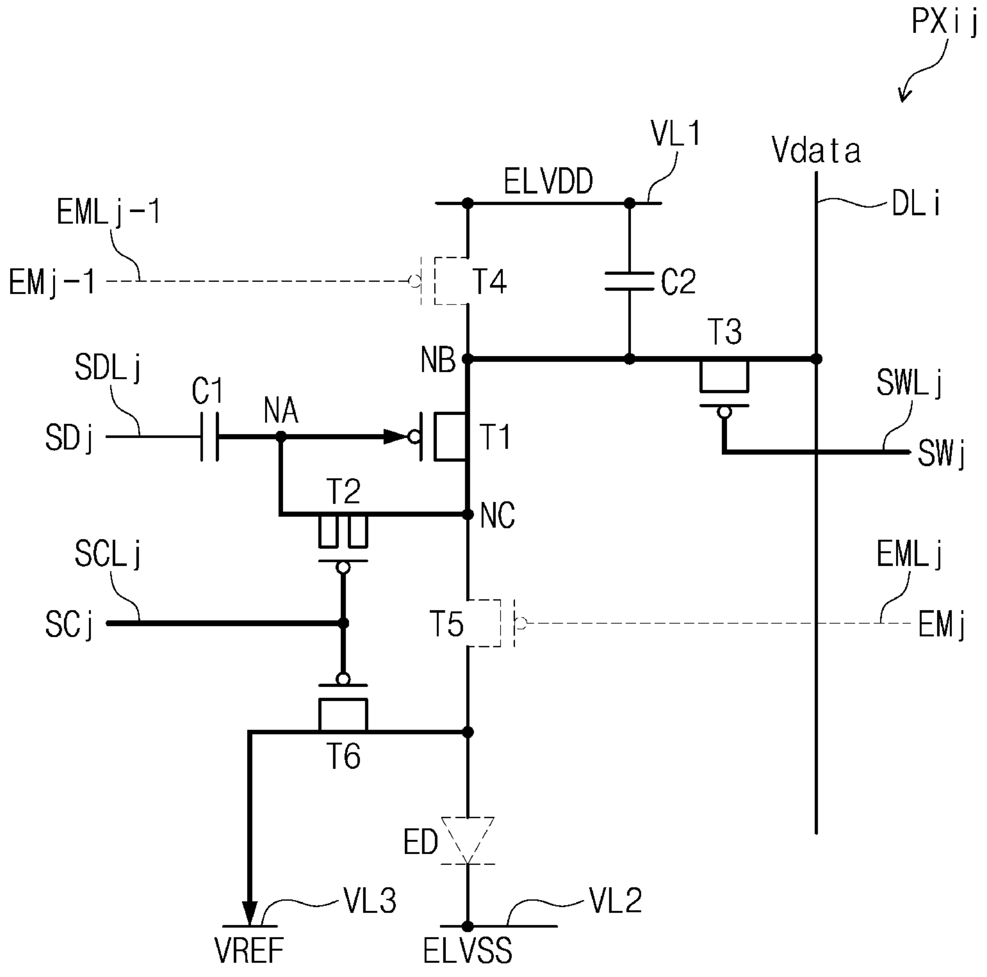
FIGS. 5A and 5B are diagrams for describing an operation of a pixel during a second period, according to an embodiment of the disclosure.
Figure 5B:
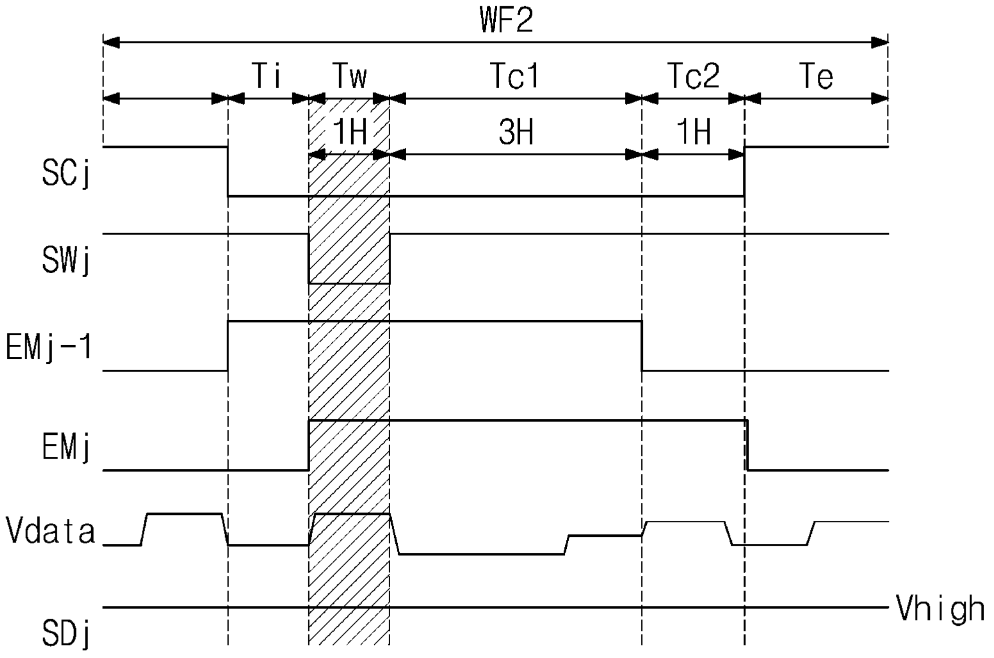
Figure 6A:
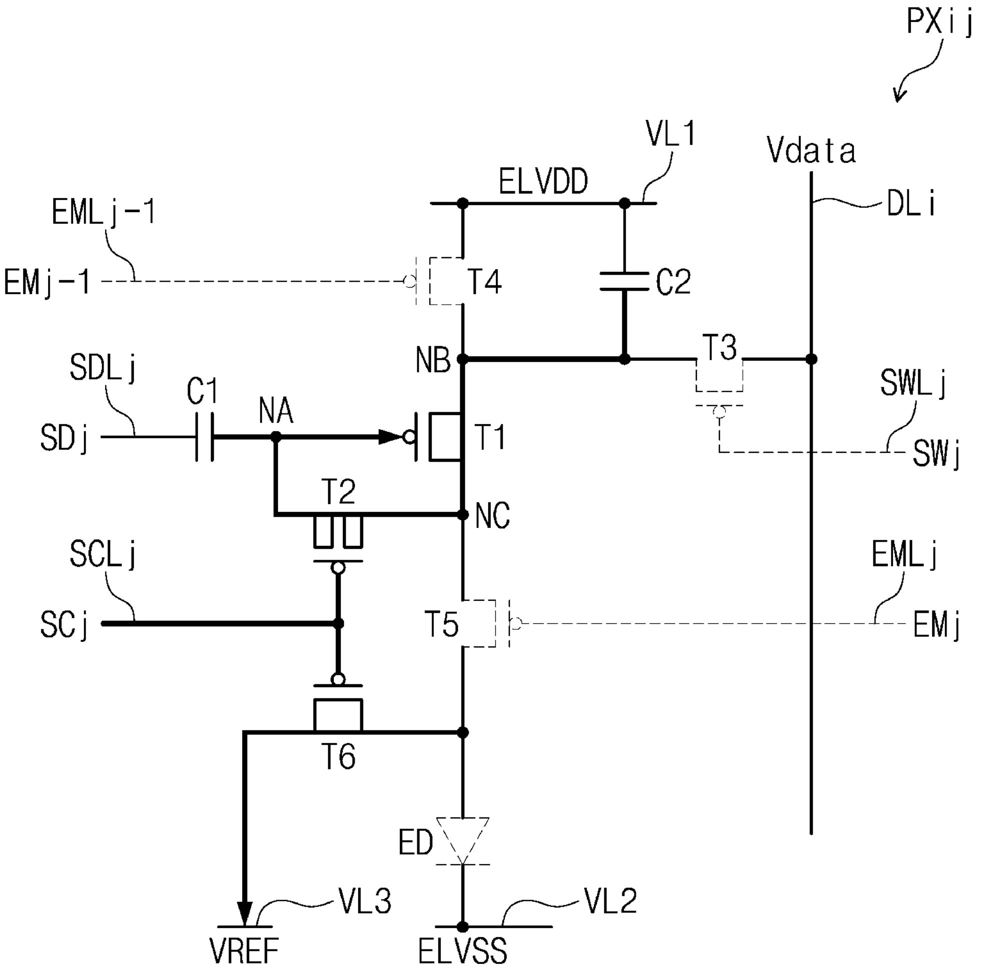
FIGS. 6A and 6B are diagrams for describing an operation of a pixel during a third period, according to an embodiment of the disclosure.
Figure 6B:
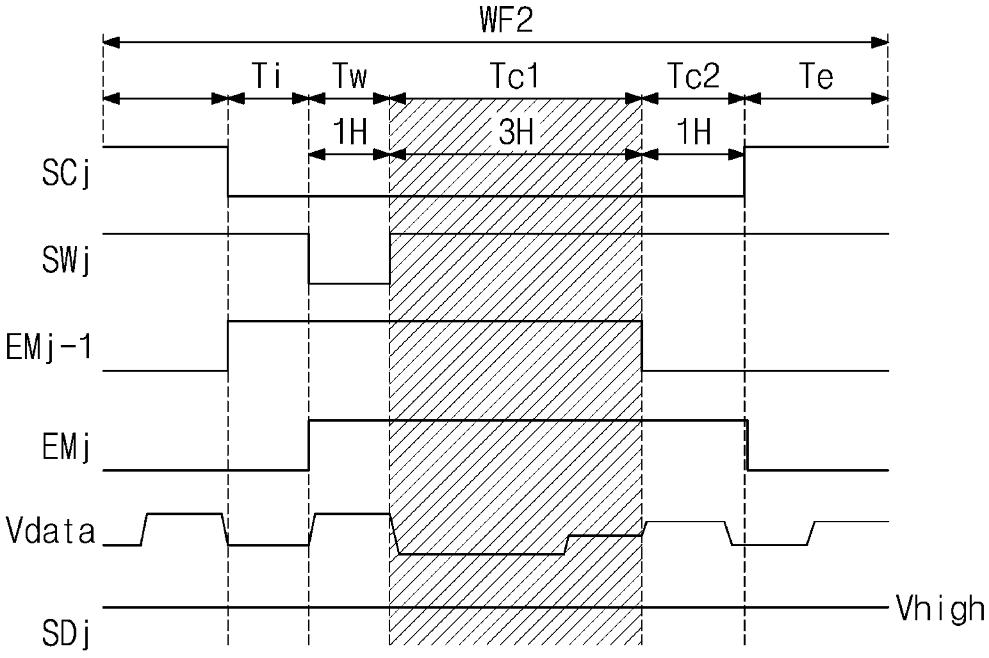
Figure 7A:
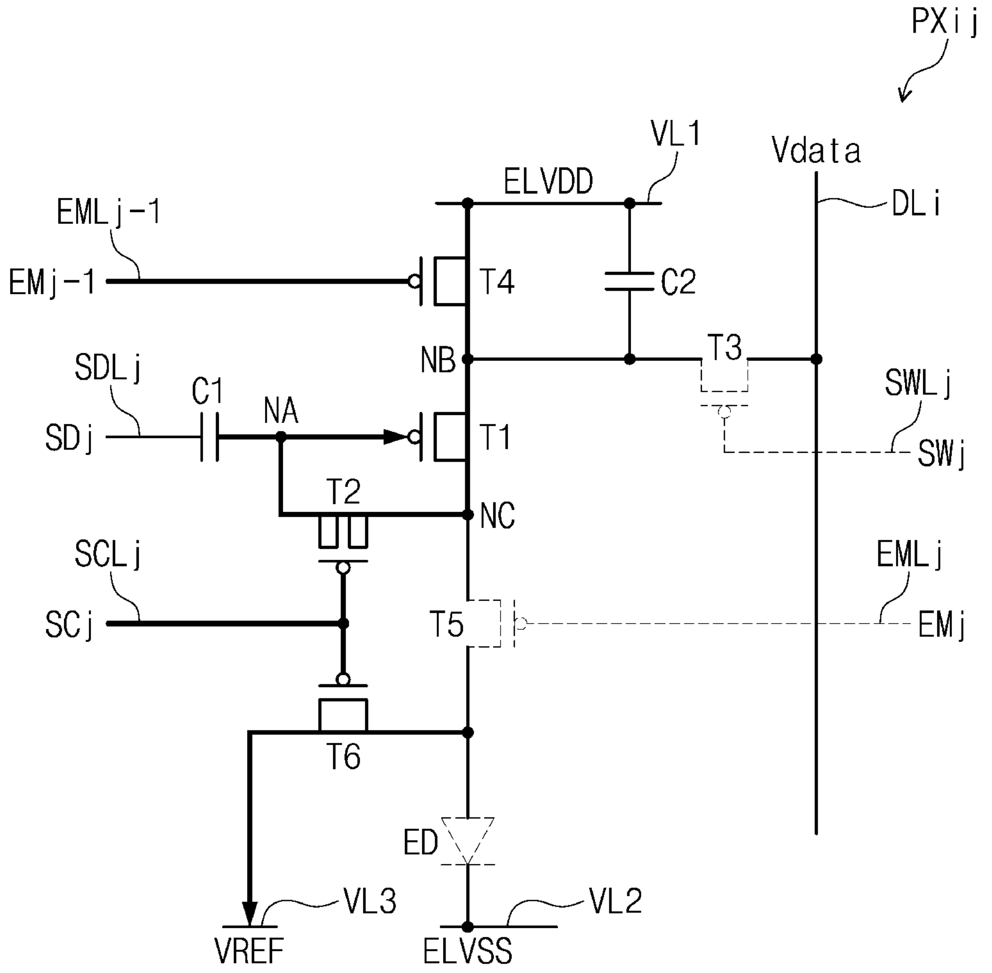
FIGS. 7A and 7B are diagrams for describing an operation of a pixel during a fourth period, according to an embodiment of the disclosure.
Figure 7B:
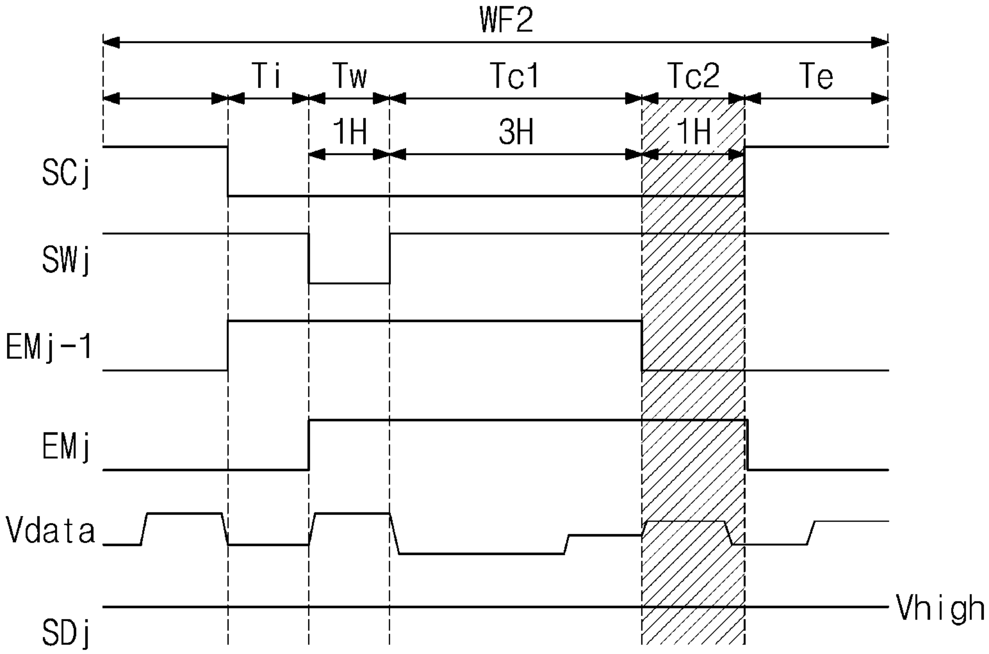
Figure 7C:
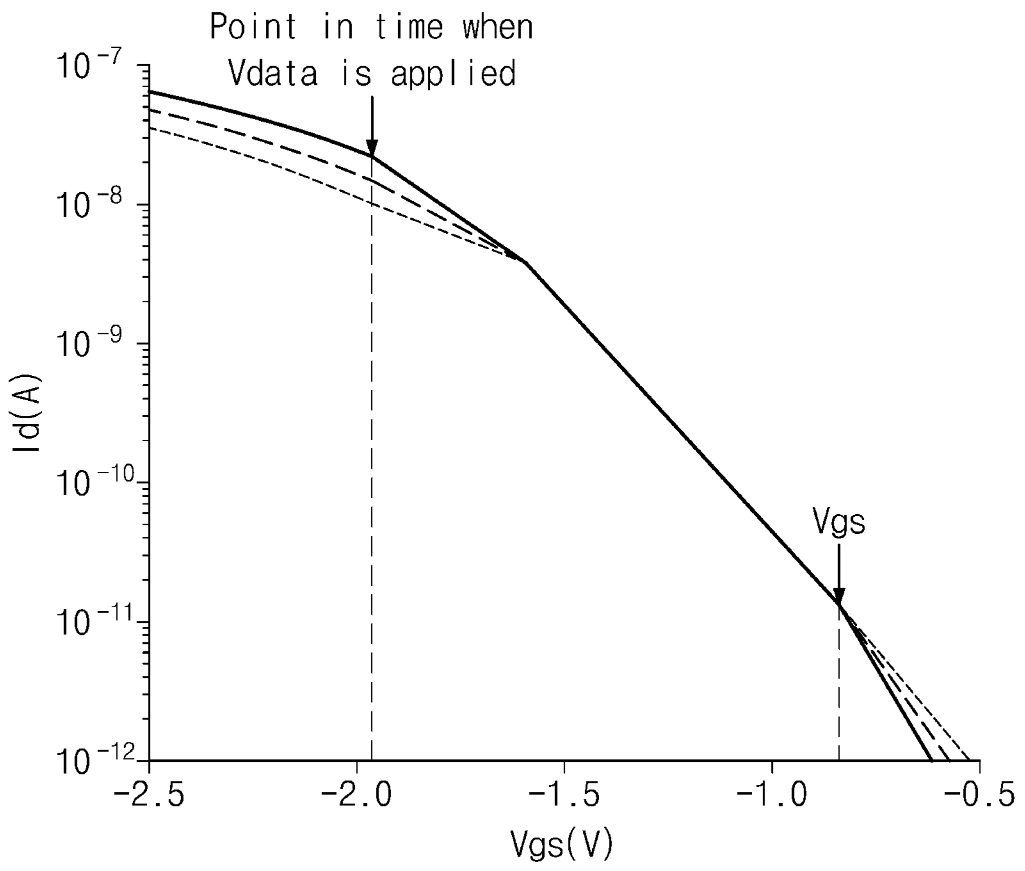
FIG. 7C is a diagram for describing a current deviation compensation process, according to an embodiment of the disclosure.
Figure 8A:
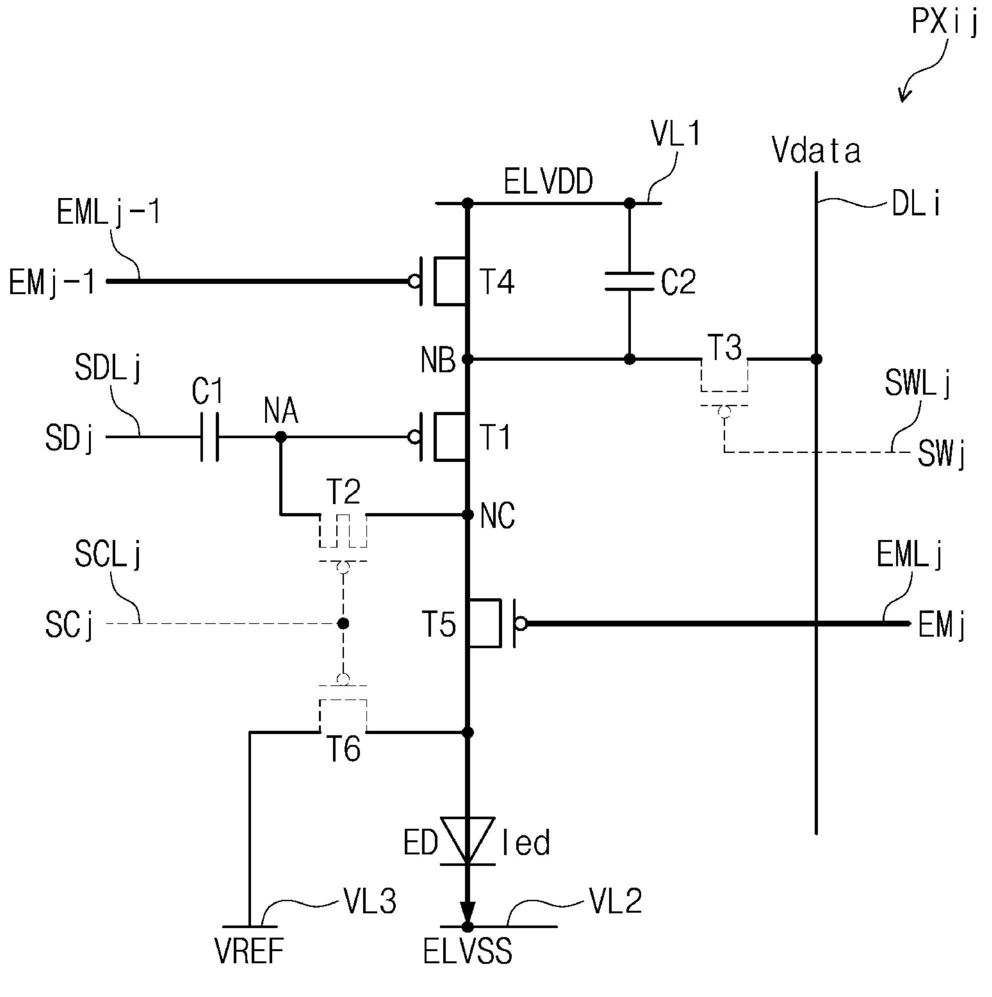
FIGS. 8A and 8B are diagrams for describing an operation of a pixel during a fifth period, according to an embodiment of the disclosure.
Figure 8B:
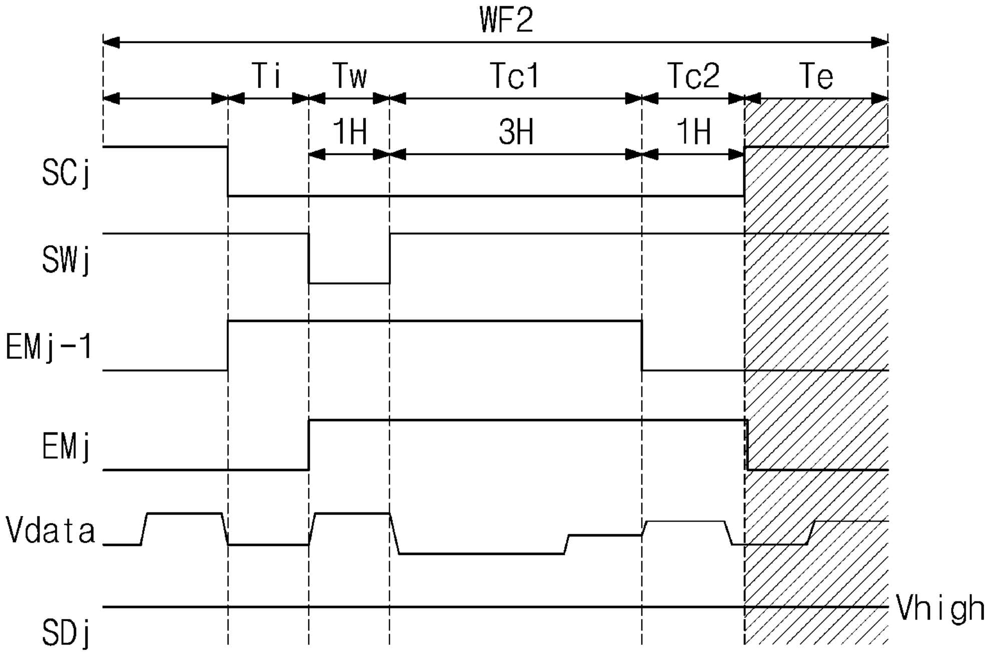

FIGS. 4A and 4B are diagrams for describing an operation of a pixel during a first period, according to an embodiment of the disclosure. FIGS. 5A and 5B are diagrams for describing an operation of a pixel during a second period, according to an embodiment of the disclosure. FIGS. 6A and 6B are diagrams for describing an operation of a pixel during a third period, according to an embodiment of the disclosure. FIGS. 7A and 7B are diagrams for describing an operation of a pixel during a fourth period, according to an embodiment of the disclosure. FIG. 7C is a diagram for describing a current deviation compensation process, according to an embodiment of the disclosure. FIGS. 8A and 8B are diagrams for describing an operation of a pixel during a fifth period, according to an embodiment of the disclosure.

FIGS. 4B, 5B, 6B, 7B, and 8B illustrate an operation of the pixel PXij during the second write frame WF2 shown in FIG. 3B. In such an embodiment, the operation of the pixel PXij may be equally implemented during the first write frame WF1. In FIGS. 4B, 5B, 6B, 7B, and 8B, the second write frame WF2 includes first to fifth periods Ti, Tw, Tc1, Tc2, and Te.

Referring to FIGS. 4A and 4B, during the first period Ti of the second write frame WF2, each of the j-th compensation scan signal SCj (i.e., the first and third scan signals) and the j-th emission control signal EMj (i.e., the second emission control signal) has the activation level. Accordingly, during the first period Ti, the second and sixth transistors T2 and T6 are turned on in response to the j-th compensation scan signal SCj, and the fifth transistor T5 is turned on in response to the j-th emission control signal EMj.

The reference voltage VREF is applied to the anode of the light emitting element ED through the turned-on sixth transistor T6. Accordingly, the anode of the light emitting element ED may be initialized to the reference voltage VREF. In addition, the reference voltage VREF is applied to the first node NA and the third node NC through the turned-on second and fifth transistors T2 and T5. When the first transistor T1 is turned on in response to the reference voltage VREF applied to the first node NA, the reference voltage VREF may be applied to the second node NB through the turned-on first transistor T1. That is, the first period Ti may be an initialization period in which the anode of the light emitting element ED, the first node NA, the second node NB, and the third node NC are initialized to the reference voltage VREF.

During the first period Ti of the second write frame WF2, the (j−1)-th emission control signal EMj−1 (i.e., the first emission control signal), each of the j-th write scan signal SWj (i.e., the second scan signal), and the j-th carrier trapping induction signal SDj has the deactivation level. Accordingly, during the first period Ti, the fourth transistor T4 is turned off in response to the (j−1)-th emission control signal EMj−1, and the third transistor T3 is turned off in response to the j-th write scan signal SWj.

The j-th compensation scan signal SCj may be activated prior to the j-th write scan signal SWj by the duration (e.g., one horizontal scan period (1H period)) of the first period Ti. The (j−1)-th emission control signal EMj−1 may be deactivated prior to the j-th emission control signal EMj by the duration of the first period Ti.

Referring to FIGS. 5A and 5B, during the second period Tw of the second write frame WF2, each of the j-th compensation scan signal SCj and the j-th write scan signal SWj has the activation level. Accordingly, the second, third, and sixth transistors T2, T3, and T6 are turned on during the second period Tw. During the second period Tw of the second write frame WF2, each of the (j−1)-th and j-th emission control signals EMj−1 and EMj has the deactivation level. Accordingly, during the second period Tw, the fourth and fifth transistors T4 and T5 are turned off in response to the (j−1)-th and j-th emission control signals EMj−1 and EMj, respectively.

The potential of the anode of the light emitting element ED may be maintained as the reference voltage VREF through the sixth transistor T6, which is turned on even during the second period Tw.

The i-th data voltage Vdata may be applied to the second node NB through the turned-on third transistor T3 and may be stored in the second capacitor C2. Also, the i-th data voltage Vdata is applied to the first node NA via the turned-on first and second transistors T1 and T2. Accordingly, the potential of the first node NA is changed to “Vdata-Vth”. Here, “Vth” may be a threshold voltage of the first transistor T1. The second period Tw may be a write period in which the data voltage Vdata is written to the first node NA.

In an embodiment of the disclosure, the second period Tw may be a period consecutive to the first period Ti, and the duration of the second period Tw may be substantially equal to the duration of the first period Ti. When the duration of the second period Tw is short, the potential of the first node NA may not have a sufficient voltage value corresponding to the deviation and change in the threshold voltage Vth of the first transistor T1. Accordingly, after the second period Tw, the third period Tc1 for compensating the deviation and change in the threshold voltage may be continuously provided.

Referring to FIGS. 6A and 6B, during the third period Tc1 of the second write frame WF2, the j-th compensation scan signal SCj has an activation level and the j-th write scan signal SWj has a deactivation level. During the third period Tc1, the second and sixth transistors T2 and T6 may be turned on in response to the j-th compensation scan signal SCj. Also, even when the third transistor T3 is turned off during the third period Tc1, the potential of the second node NB may maintain the i-th data voltage Vdata by the second capacitor C2. Here, the potential of the second node NB may be lower than the i-th data voltage Vdata by the capacitance of the second capacitor C2 and the magnitude of the current flowing through the first transistor T1.

During the third period Tc1, the voltage of the second node NB may be applied to the first node NA through the turned-on first and second transistors T1 and T2. In this case, the duration of the third period Tel may be greater than the duration of the second period Tw. In an embodiment of the disclosure, the duration of the third period Tc1 may be three or more times greater than the duration of the second period Tw. Accordingly, during the third period Tc1, the deviation and change in the threshold voltage (Vth) of the first transistor T1 may be sufficiently reflected in the potential of the first node NA.

The potential of the anode of the light emitting element ED may be maintained to the reference voltage VREF through the sixth transistor T6, which is turned on even during the third period Tc1.

During the third period Tc1 of the second write frame WF2, each of the (j−1)-th and j-th emission control signals EMj−1 and EMj has the deactivation level. Accordingly, during the third period Tc1, the fourth and fifth transistors T4 and T5 are turned off in response to the (j−1)-th and j-th emission control signals EMj−1 and EMj, respectively.

Referring to FIGS. 7A to 7C, during the fourth period Tc2 of the second write frame WF2, the j-th compensation scan signal SCj has the activation level, and the j-th write scan signal SWj has the deactivation level. Moreover, during the fourth period Tc2, the (j−1)-th emission control signal EMj−1 has the activation level, and the j-th emission control signal EMj has a deactivation level. Accordingly, during the fourth period Tc2, the second and sixth transistors T2 and T6 may be turned on in response to the j-th compensation scan signal SCj, and the fourth transistor T4 may be turned on in response to the (j−1)-th emission control signal EMj−1.

When the duration of the third period Tel becomes long, a voltage higher than the threshold voltage (Vth) of the first transistor T1 may be sensed at a gate-source node of the first transistor T1. Accordingly, when the i-th data voltage Vdata of a high grayscale is applied, as shown in FIG. 7C, a deviation (i.e., a current deviation) in drain current Id may occur due to a slope deviation at the threshold voltage (Vth) of the first transistor T1 or less.

In an embodiment, the fourth transistor T4 may be turned on during the fourth period Tc2 to compensate this current deviation. The first driving voltage ELVDD is applied to the second node NB through the turned-on fourth transistor T4. When the potential of the second node NB changes to the first driving voltage ELVDD, a current path is formed from the second node NB to the first node NA through the turned-on first and second transistors T1 and T2. In this case, a current draining to the first node NA through the first and second transistors T1 and T2 may be referred to as a “sink current”. The magnitude of the sink current depends on the slope deviation at the threshold voltage (Vth) of the first transistor T1 or less. The potential of the first node NA during the fourth period Tc2 may be changed to “Vdata- Vth-Vss" by the sink current. Here, "Vss" may be a voltage corresponding to the slope deviation at the threshold voltage (Vth) of the first transistor T1 or less. Accordingly, the voltage corresponding to the slope deviation at the threshold voltage (Vth) of the first transistor T1 or less may be stored (or reflected) at the first node NA.

Referring to FIGS. 8A and 8B, during the fifth period Te of the second write frame WF2, each of the j-th compensation scan signal SCj and the j-th write scan signal SWj has the deactivation level. Accordingly, the second, third, and sixth transistors T2, T3, and T6 are turned off during the fifth period Te.

During the fifth period Te of the second write frame WF2, each of the (j−1)-th and j-th emission control signals EMj−1 and EMj has the activation level. Accordingly, during the fifth period Te, the fourth and fifth transistors T4 and T5 are turned on in response to the (j−1)-th and j-th emission control signals EMj−1 and EMj. As the fourth transistor T4 is turned on, the first driving voltage ELVDD is supplied to the second node NB. Accordingly, a current flowing from the second node NB to the third node NC through the first transistor T1 may be applied to the light emitting element ED through the turned-on fifth transistor T5. An emission current led flowing to the light emitting element ED may be controlled depending on a voltage level of the first node NA, and the light emitting element ED may output light corresponding to the emission current led. Accordingly, the fifth period Te may be an emission period in which the light emitting element ED emits light. In such an embodiment, the first to fourth periods Ti, Tw, Tc1, and Tc2 may be a non-emission period in which the light emitting element ED does not emit light.

The emission current led depends on the threshold voltage Vth of the first transistor T1. The deviation in the threshold voltage (Vth) of the first transistor T1 may occur depending on locations of the pixels PX (see FIG. 1), and may be shifted due to degradation according to operating time. In detail, because the degree of change (or deterioration) of the threshold voltage (Vth) of the first transistor T1 is different for each pixel PX, the shift degree of the threshold voltage (Vth) of the first transistor T1 is also different for each pixel PX.

In an embodiment, as described above in FIGS. 6A and 6B, as the duration of the third period Tc1 is sufficiently long regardless of an operating frequency, the deviation in the threshold voltage (Vth) and a change in the threshold voltage (Vth) may be sufficiently compensated. In such an embodiment, as shown in FIGS. 7A and 7B, the current deviation may be compensated by turning on the fourth transistor T4 during the fourth period Tc2 such that the voltage (Vss) corresponding to the slope deviation at the threshold voltage (Vth) of the first transistor T1 or less is stored or reflected in the first node NA. Accordingly, a luminance deviation may be effectively prevented from occurring for each pixel due to the current deviation in a high grayscale area.

In an embodiment of the disclosure, the j-th carrier trapping induction signal SDj has a first level Vhigh (see FIG. 9B) during the second write frame WF2. The j-th carrier trapping induction signal SDj maintains the first level Vhigh during the first to fifth periods Ti, Tw, Tc1, Tc2, and Te. Here, the first level Vhigh may be a level corresponding to the deactivation level of the j-th compensation scan signal SCj and the j-th write scan signal SWj.

Figure 9A:
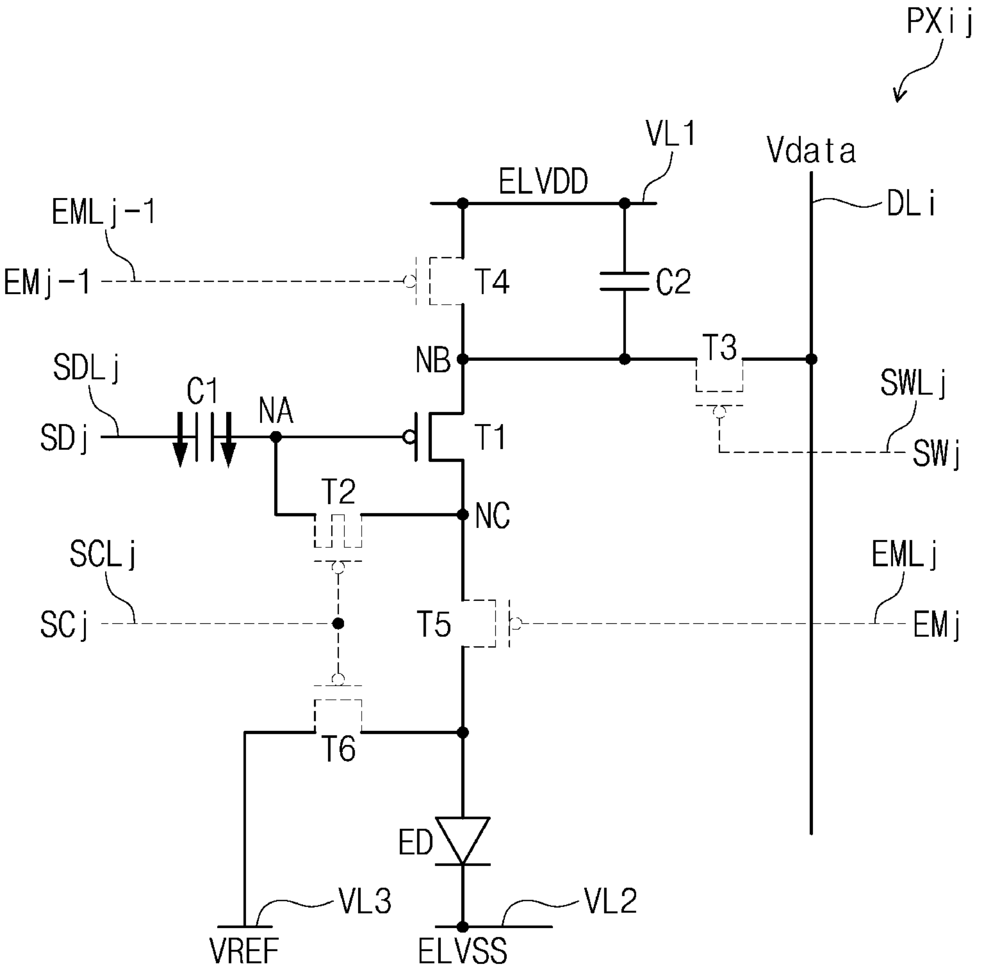
FIGS. 9A and 9B are diagrams for describing an operation of a pixel during a sixth period, according to an embodiment of the disclosure.
Figure 9B:
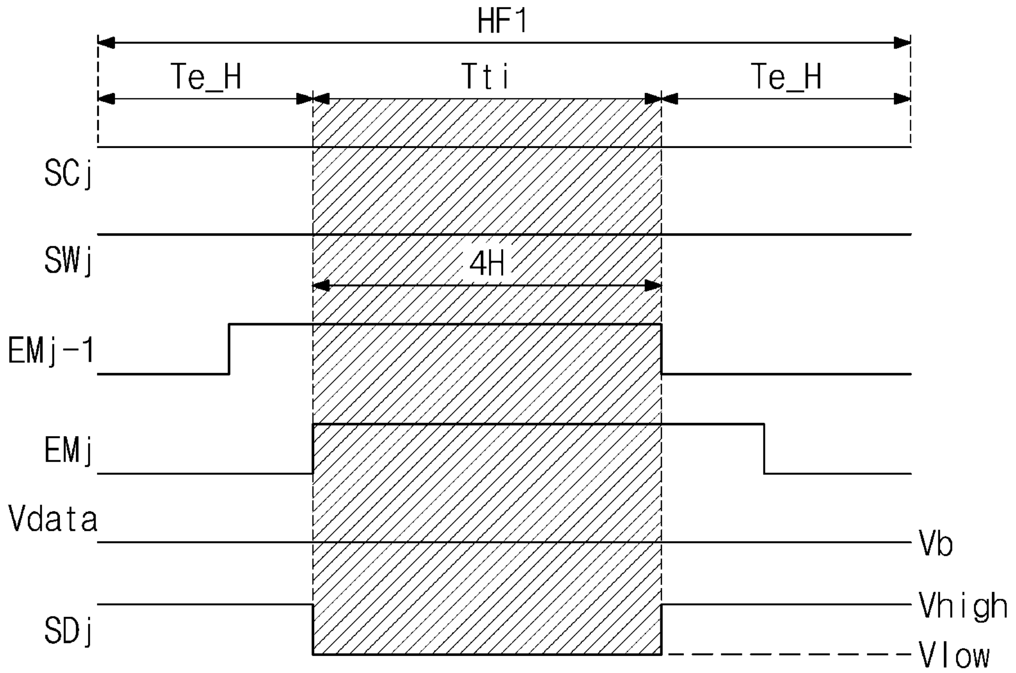

FIGS. 9A and 9B are diagrams for describing an operation of a pixel during a sixth period, according to an embodiment of the disclosure.

Referring to FIGS. 9A and 9B, when a first holding frame HF1 among the holding frames HF1, HF2, and HF3 (see FIG. 3B) starts, the i-th data voltage Vdata may be held as the bias voltage Vb. The bias voltage Vb may be a voltage maintained at a constant voltage level during the holding frames HF1, HF2, and HF3. In an embodiment of the disclosure, the bias voltage Vb may have a voltage level corresponding to a black grayscale, but is not limited thereto. During the holding frames HF1, HF2, and HF3, each of the j-th compensation scan signal SCj and the j-th write scan signal SWj maintains the deactivation level. Each of the (j−1)-th and j-th emission control signals EMj−1 and EMj has the deactivation level during a sixth period Tti of the first holding frame HF1.

During the sixth period Tti, the j-th carrier trapping induction signal SDj has a second level Vlow different from the first level Vhigh. In an embodiment of the disclosure, the second level Vlow may be a lower voltage level than the first level Vhigh. However, the disclosure is not limited thereto. In an embodiment, where the first transistor T1 is an N-type transistor, the second level Vlow may be a higher voltage level than the first level Vhigh.

The sixth period Tti may be a period in which both the (j−1)-th and j-th emission control signals EMj−1 and EMj are in a deactivation state during the first holding frame HF1. In an embodiment of the disclosure, the duration of the sixth period Tti may be greater than the duration of the first period Ti. In an embodiment of the disclosure, the duration of the sixth period Tti may be four or more times greater than the duration of the first period Ti.

When the voltage level of the j-th carrier trapping induction signal SDj is lowered to the second level Vlow lower than the first level Vhigh during the sixth period Tti, the potential of the first node NA may also be lowered due to the coupling of the first capacitor C1. When the potential of the first node NA is lowered, a carrier trapping phenomenon that electrons or holes are trapped between a channel and a gate insulator of the first transistor T1 may be induced.

After the sixth period Tti, a seventh period Te_H may start. The seventh period Te_H may be a period in which operations are performed in the same way as the fifth period Te shown in FIGS. 8A and 8B. That is, the seventh period Te_H may also be defined as an emission period. As the carrier trapping phenomenon is first induced during the sixth period Tti before the seventh period Te_H starts, the magnitude of the current change occurring by the carrier trapping phenomenon during the seventh period Te_H may be reduced.

FIG. 9B shows only the first holding frame HF1 among the holding frames HF1, HF2, and HF3, but the second and third holding frames HF2 and HF3 may also operate in the same way as the first holding frame HF1.

Figure 10A:
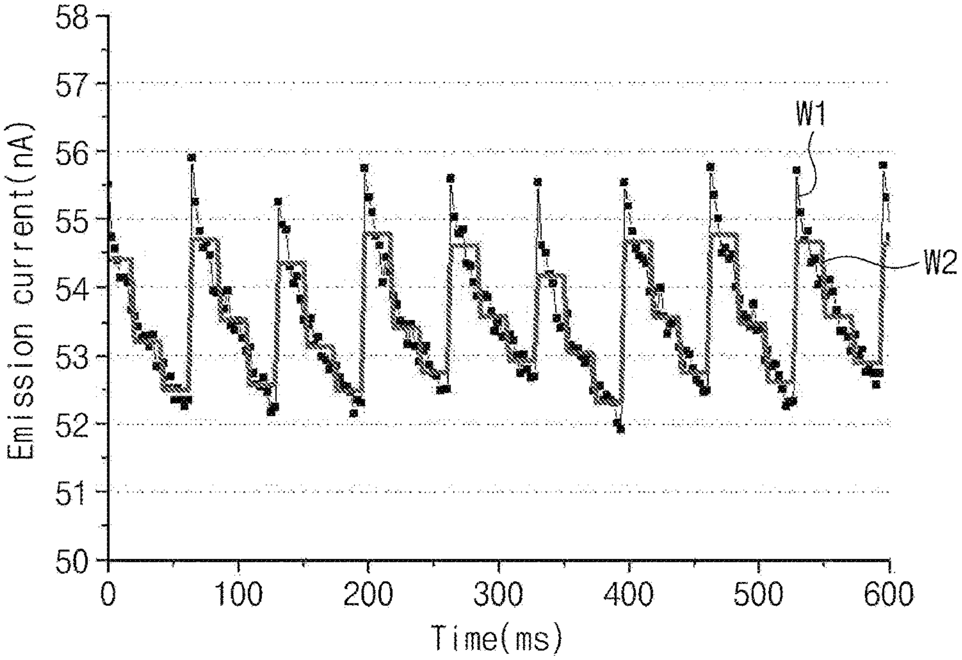
FIGS. 10A and 10B are waveform diagrams illustrating a decrease in an emission current change according to a carrier trapping induction signal, according to an embodiment of the disclosure.
Figure 10B:
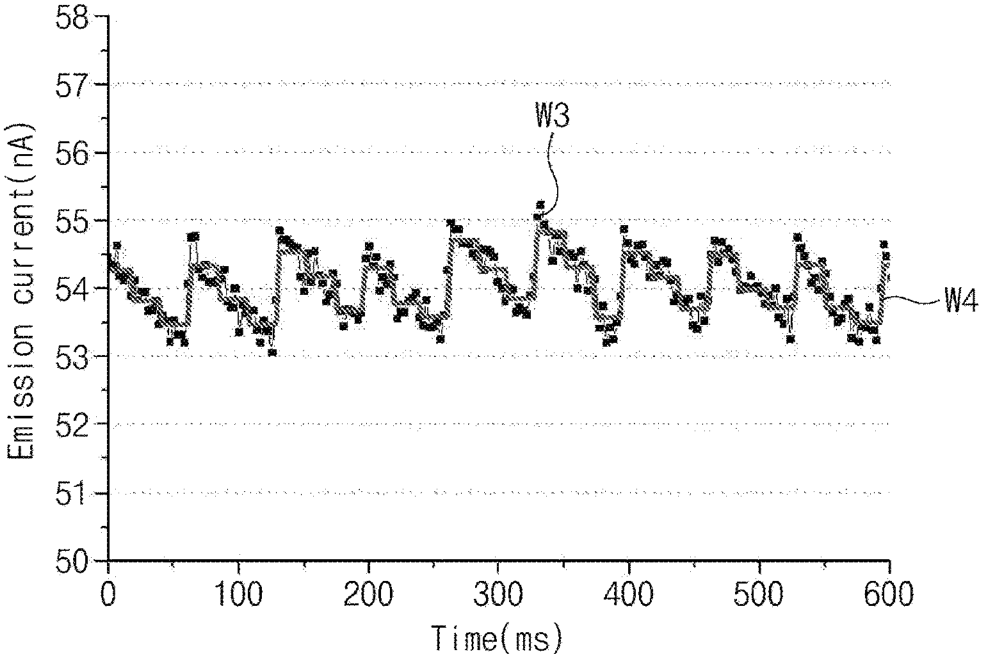

FIGS. 10A and 10B are waveform diagrams illustrating a decrease in an emission current change according to a carrier trapping induction signal, according to an embodiment of the disclosure. FIG. 10A shows a change in the emission current Ied (see FIG. 8A) measured when the j-th carrier trapping induction signal SDj (see FIG. 9B) is maintained at the first level Vhigh during holding frames HF1, HF2, and HF3 (see FIG. 3B). FIG. 10B shows a change in the emission current led measured when the j-th carrier trapping induction signal SDj is changed to the second level Vlow during the sixth period Tti (see FIG. 9B) of the holding frames HF1, HF2, and HF3 (see FIG. 3B). In particular, in FIGS. 10A and 10B, first and third waveforms W1 and W3 respectively represent the emission current led thus actually measured, and second and fourth waveforms W2 and W4 respectively represent values obtained by integrating the first and third waveforms W1 and W3 in units of preset reference time and then dividing the integrated values by a reference time.

Referring to FIG. 10A, when the j-th carrier trapping induction signal SDj does not change to the second level Vlow and remains at the first level Vhigh before the seventh period Te_H of the first holding frame HF1 starts, the carrier trapping phenomenon may not occur. Afterward, when the seventh period Te_H starts, the carrier trapping phenomenon occurs from a starting time point of the seventh period Te_H. During the seventh period Te_H, a current change phenomenon that the emission current led gradually decreases due to the carrier trapping phenomenon may occur. When the carrier trapping phenomenon occurs after the starting time point of the seventh period Te_H, the amount of change in the emission current led may be the approximate magnitude of 4 nanoamperes (nA) (=56 nA−52 nA).

Referring to FIGS. 9B and 10B, during the sixth period Tti before the seventh period Te_H of the first holding frame HF1 starts, the j-th carrier trapping induction signal SDj may be lowered to the second level Vlow. In other words, before the starting time point of the seventh period Te_H, the carrier trapping phenomenon may occur in advance due to the j-th carrier trapping induction signal SDj. Accordingly, the sixth period Tti may be referred to as a "carrier trapping induction period". When the seventh period Te_H starts after the carrier trapping phenomenon has progressed during a predetermined time (i.e., during the sixth period Tti), the amount of change in the emission current led reduced by the carrier trapping phenomenon may be reduced. That is, when the carrier trapping phenomenon occurs in advance before the starting time point of the seventh period Te_H, the amount of change in the emission current led may be the approximate magnitude of 2 nA (=55 nA−53 nA).

A change in the emission current led flowing into the light emitting element ED changes luminance, and thus a user may perceive a change in luminance as a flicker. In an embodiment of the disclosure, it is possible to reduce the change in the emission current led during the seventh period Te_H by generating the carrier trapping phenomenon before the seventh period Te_H during the holding frames HF1, HF2, and HF3. As a result, a flicker phenomenon may be effectively prevented or substantially reduced.

Figure 11:
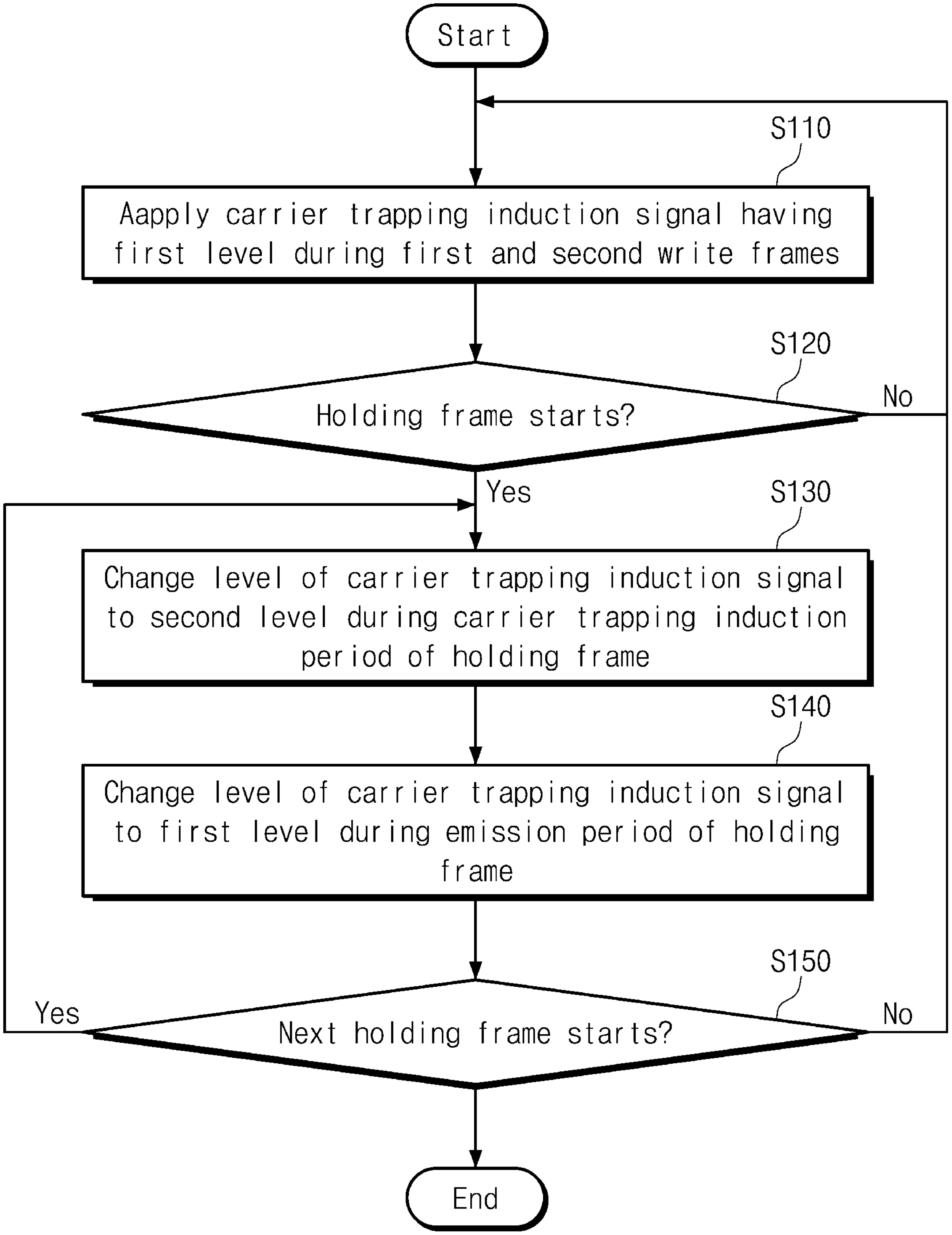
FIG. 11 is a flowchart illustrating an operation process of a display device, according to an embodiment of the disclosure.

FIG. 11 is a flowchart illustrating an operation process of a display device, according to an embodiment of the disclosure.

Referring to FIGS. 1, 3A, 3B and 11, an embodiment of the display device DD displays an image during a plurality of frames. At least one frame (e.g., the second frame F2) among the plurality of frames includes the second write frame WF2 and the holding frames HF1, HF2, and HF3.

According to an embodiment of a driving method of the display device DD, the carrier trapping control circuit 400 may apply a carrier trapping induction signal having the first level Vhigh (see FIG. 9B) to the carrier trapping induction lines SDL1 to SDLn during the first and second write frames WF1 and WF2 (S110).

Afterward, the display device DD may determine whether at least one (e.g., the first holding frame HF1) of the holding frames HF1, HF2, and HF3 starts (S120).

When it is determined that the first holding frames HF1 starts, the carrier trapping control circuit 400 may sequentially apply the carrier trapping induction signal having the second level Vlow (see FIG. 9B) lower than the first level Vhigh to the carrier trapping induction lines SDL1 to SDLn during the carrier trapping induction period Tti (see FIG. 9B) preceding the emission period Te_H (see FIG. 9B) of the holding frames HF1, HF2, and HF3 (S130). However, when it is not determined that the holding frames HF1, HF2, and HF3 start, the procedure may proceed to operation S110, and the carrier trapping control circuit 400 may maintain the carrier trapping induction signal to be at the first level.

Then, when the carrier trapping induction period Tti ends and then the emission period Te_H starts, the carrier trapping control circuit 400 may change a level of the carrier trapping induction signal to the first level Vhigh (S140).

Afterward, the display device DD may determine whether a next holding frame (e.g., the second holding frame HF2) starts (S150). When it is determined that the second holding frames HF2 starts, the procedure may proceed to operation S130, and the carrier trapping control circuit 400 may sequentially apply the carrier trapping induction signal having the second level Vlow lower than the first level Vhigh to the carrier trapping induction lines SDL1 to SDLn during the carrier trapping induction period Tti preceding the emission period Te_H (see FIG. 9B) of the second holding frame HF2.

However, when the second holding frame HF2 is not started, the procedure may proceed to operation S110, and the carrier trapping control circuit 400 may maintain the carrier trapping induction signal to be at the first level Vhigh.

In embodiments of the disclosure, it is possible to reduce a change in the emission current led during the emission period Te_H by generating the carrier trapping phenomenon before the emission period Te_H during the holding frames HF1, HF2, and HF3. As a result, the flicker phenomenon may be effectively prevented or substantially reduced.

According to an embodiment of the disclosure, it is possible to secure a sufficient compensation period to compensate a deviation or a change in a threshold voltage of a first transistor even in a high-speed operation, thereby minimizing a deviation in current provided to a light emitting element when a low-grayscale image is displayed at a high operating frequency. In such an embodiment, when a high-grayscale image is displayed, a current deviation occurring at less than the threshold voltage is compensated through a sink current, thereby preventing a luminance deviation from occurring due to the current deviation.

In such an embodiment, it is possible to reduce a change in an emission current during an emission period by generating a carrier trapping phenomenon before the emission period during a holding frame. As a result, a flicker phenomenon may be effectively prevented or substantially reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a pixel, wherein the pixel includes:

a light emitting element;

a first capacitor connected to a first node;

a second capacitor connected between a second node and a voltage line;

a first transistor connected to the first node, the second node, and a third node;

a second transistor connected between the third node and the first node, wherein the second transistor receives a first scan signal;

a third transistor connected between the second node and a data line, wherein the third transistor receives a second scan signal;

a fourth transistor connected between the second node and the voltage line, wherein the fourth transistor receives a first emission control signal;

a fifth transistor connected between the third node and the light emitting element, wherein the fifth transistor receives a second emission control signal; and a sixth transistor connected between the light emitting element and a reference voltage line, wherein the sixth transistor receives a third scan signal, wherein the display panel displays an image during a plurality of frames, and at least one frame among the plurality of frames includes a write frame and a holding frame, wherein each of the first scan signal, the second scan signal, and the third scan signal has an activation level within the write frame and remains a deactivation state during the holding frame, and wherein each of the first emission control signal and the second emission control signal has the activation level within the write frame and the holding frame.

2. The display device of claim 1, wherein, during a first period, each of the first scan signal and the third scan signal has an activation level, and wherein, during the first period, the first emission control signal has a deactivation level, and the second emission control signal has the activation level.

3. The display device of claim 2, wherein, during the first period, the first node, the second node, and the third node are initialized to a reference voltage applied through the reference voltage line.

4. The display device of claim 2, wherein the first scan signal and the third scan signal are a same signal as each other, and wherein the first scan signal and the third scan signal are activated prior to the second scan signal by a duration of the first period.

5. The display device of claim 4, wherein a second period follows the first period, wherein, during the second period, each of the first scan signal, the second scan signal, and the third scan signal has the activation level, and wherein, during the second period, each of the first emission control signal and the second emission control signal has the deactivation level.

6. The display device of claim 5, wherein, during the second period, a data voltage applied to the data line is applied to the first node by sequentially passing through the third transistor, the first transistor, and the second transistor, which are turned on in response to the first scan signal and the second scan signal.

7. The display device of claim 5, wherein a third period follows the second period, wherein, during the third period, each of the first scan signal and the third scan signal has the activation level, and wherein, during the third period, each of the second scan signal, the first emission control signal, and the second emission control signal has the deactivation level.

8. The display device of claim 7, wherein a duration of the first period is substantially equal to a duration of the second period, and wherein a duration of the third period is greater than the duration of each of the first period and the second period.

9. The display device of claim 7, wherein a fourth period follows the third period, wherein, during the fourth period, each of the first scan signal, the third scan signal, and the first emission control signal has the activation level, and wherein, during the fourth period, each of the second scan signal and the second emission control signal has the deactivation level.

10. The display device of claim 9, wherein a duration of the fourth period is substantially equal to a duration of the second period, and wherein a duration of the third period is greater than the duration of each of the first period and the second period.

11. The display device of claim 10, wherein, during the fourth period, the second transistor and the fourth transistor are turned on in response to the first scan signal and the first emission control signal, respectively, and wherein a current drains to the first node through the fourth transistor, the first transistor, and the second transistor, which are turned on.

12. The display device of claim 9, wherein a fifth period follows the fourth period, wherein, during the fifth period, each of the first emission control signal and the second emission control signal has the activation level, and wherein, during the fifth period, each of the first scan signal, the second scan signal, and the third scan signal has the deactivation level.

13. The display device of claim 1, wherein the first capacitor is connected between a carrier trapping induction line, which receives a carrier trapping induction signal, and the first node, and wherein the carrier trapping induction signal has a first level during the write frame and has a second level different from the first level during the holding frame.

14. The display device of claim 13, wherein, during the holding frame, a sixth period precedes a seventh period, wherein, during the sixth period, each of the first scan signal, the second scan signal, the third scan signal, the first emission control signal, and the second emission control signal has a deactivation level, and wherein, during the sixth period, the carrier trapping induction signal has the second level.

15. The display device of claim 14, wherein, during the seventh period, each of the first emission control signal and the second emission control signal has the activation level, and wherein the carrier trapping induction signal has the first level.

16. The display device of claim 1, further comprising:

a panel driver which drives the display panel, wherein the panel driver includes:

a scan driving circuit which outputs the first scan signal, the second scan signal, and the third scan signal; and an emission driving circuit which outputs the first emission control signal and the second emission control signal, and wherein the emission driving circuit operates at a frequency higher than or equal to a frequency of the scan driving circuit.

17. The display device of claim 16, wherein the first capacitor is connected between a carrier trapping induction line, which receives a carrier trapping induction signal, and the first node, and wherein the panel driver further includes:

a carrier trapping control circuit which supplies the carrier trapping induction signal to the carrier trapping induction line.

18. The display device of claim 17, wherein the carrier trapping induction signal has a first level during the write frame and has a second level lower than the first level during the holding frame.

19. An electronic device comprising:

a display panel including a pixel; and a panel driver which drives the display panel, wherein the pixel includes:

a light emitting element;

a first capacitor connected between a carrier trapping induction line, which receives a carrier trapping induction signal, and a first node;

a first transistor connected between a second node and a third node, wherein the first transistor operates depending on a potential of the first node;

a second transistor connected between the third node and the first node, wherein the second transistor operates depending on a first scan signal; and a third transistor connected between the second node and a data line, wherein the third transistor operates depending on a second scan signal, wherein the display panel displays an image during a plurality of frames, and at least one frame among the plurality of frames includes a write frame and a holding frame, and wherein the carrier trapping induction signal has a first level during the write frame and has a second level different from the first level during a carrier trapping induction period preceding an emission period of the holding frame.

20. The electronic device of claim 19, wherein the second level is lower than the first level, and wherein the carrier trapping induction signal has the first level during the emission period of the holding frame.

21. The electronic device of claim 19, wherein the panel driver includes:

a carrier trapping control circuit which supplies the carrier trapping induction signal to the carrier trapping induction line; and a scan driving circuit which outputs the first scan signal and the second scan signal, and wherein each of the first scan signal and the second scan signal has a deactivation level during the carrier trapping induction period.

22. The electronic device of claim 19, wherein the pixel further includes:

a second capacitor connected between the second node and a voltage line;

a fourth transistor connected to the second node and the voltage line, wherein the fourth transistor operates depending on a first emission control signal; and a fifth transistor connected between the third node and the light emitting element, wherein the fifth transistor operates depending on a second emission control signal.

23. The electronic device of claim 22, wherein the write frame includes:

a first period in which the first scan signal and the second emission control signal are activated, and the second scan signal and the first emission control signal are deactivated;

a second period in which the first scan signal and the second scan signal are activated, and the first emission control signal and the second emission control signal are deactivated;

a third period in which the first scan signal is activated, and the second scan signal, the first emission control signal, and the second emission control signal are deactivated;

a fourth period in which the first scan signal and the first emission control signal are activated, and the second scan signal and the second emission control signal are deactivated; and a fifth period in which the first scan signal and the second scan signal are deactivated, and the first emission control signal and the second emission control signal are activated.

24. The electronic device of claim 23, wherein the second level is lower than the first level, and wherein, during the first period, the second period, the third period, the fourth period, and the fifth period, the carrier trapping induction signal has the first level.

25. A driving method of a display device including a display panel including a pixel, wherein the pixel includes:

a light emitting element;

a first capacitor connected between a carrier trapping induction line and a first node;

a first transistor connected between a second node and a third node;

a second transistor connected between the third node and the first node; and a third transistor connected between the second node and a data line, wherein the display panel displays an image during a plurality of frames, and at least one frame among the plurality of frames includes a write frame and a holding frame, and wherein the driving method comprises:

applying a carrier trapping induction signal having a first level to the carrier trapping induction line during the write frame;

determining whether the holding frame starts;

when it is determined that the holding frame starts, applying the carrier trapping induction signal having a second level lower than the first level to the carrier trapping induction line during a carrier trapping induction period preceding an emission period of the holding frame; and applying the carrier trapping induction signal having the first level to the carrier trapping induction line during the emission period of the holding frame.

26. The driving method of claim 25, wherein the pixel includes:

a second capacitor connected between the second node and a voltage line;

a fourth transistor connected to the second node and the voltage line, wherein the fourth transistor operates depending on a first emission control signal; and a fifth transistor connected between the third node and the light emitting element, wherein the fifth transistor operates depending on a second emission control signal, and wherein the second transistor operates depending on a first scan signal, and the third transistor operates depending on a second scan signal.

27. The driving method of claim 26, wherein the driving method further comprises:

during a first period of the write frame, activating the first scan signal and the second emission control signal, and deactivating the second scan signal and the first emission control signal;

during a second period of the write frame, activating the first scan signal and the second scan signal, and deactivating the first emission control signal and the second emission control signal;

during a third period of the write frame, activating the first scan signal, and deactivating the second scan signal, the first emission control signal, and the second emission control signal;

during a fourth period of the write frame, activating the first scan signal and the first emission control signal, and deactivating the second scan signal and the second emission control signal; and during a fifth period of the write frame, deactivating the first scan signal and the second scan signal, and activating the first emission control signal and the second emission control signal.

* * * * *